US011279847B2

(12) United States Patent
Niu et al.

(10) Patent No.: US 11,279,847 B2
(45) Date of Patent: Mar. 22, 2022

(54) COMPOSITION FOR PREPARING A RELEASE COATING

(71) Applicant: DOW SILICONES CORPORATION, Midland, MI (US)

(72) Inventors: Zhenbin Niu, Midland, MI (US); Nanguo Liu, Midland, MI (US); Travis Sunderland, Midland, MI (US); David Rich, Midland, MI (US); Pierre Chevalier, Seneffe (BE); Sze-Sze Ng, Midland, MI (US); Alex Knott, Seneffe (BE)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/292,304

(22) PCT Filed: Dec. 2, 2020

(86) PCT No.: PCT/US2020/062827
§ 371 (c)(1),
(2) Date: May 7, 2021

(87) PCT Pub. No.: WO2021/113317
PCT Pub. Date: Jun. 10, 2021

(65) Prior Publication Data
US 2021/0371700 A1 Dec. 2, 2021

Related U.S. Application Data

(60) Provisional application No. 62/942,687, filed on Dec. 2, 2019.

(51) Int. Cl.
C08G 77/08 (2006.01)
C09D 183/04 (2006.01)
C08L 83/04 (2006.01)
C08G 77/20 (2006.01)
B05D 3/02 (2006.01)
B05D 5/08 (2006.01)

(52) U.S. Cl.
CPC ......... C09D 183/04 (2013.01); B05D 3/0254 (2013.01); B05D 5/08 (2013.01); C08G 77/08 (2013.01); C08G 77/20 (2013.01); C08L 83/04 (2013.01); B05D 2201/02 (2013.01); B05D 2203/20 (2013.01); B05D 2518/12 (2013.01)

(58) Field of Classification Search
None
See application file for complete search history.

(56) References Cited

U.S. PATENT DOCUMENTS 6,511,714 B2    1/2003  Branlard et al.
6,727,338 B1    4/2004  Kilgour et al.
6,764,717 B2    7/2004  Herzig et al.
6,774,201 B2    8/2004  Kilgour et al.
7,378,482 B2 *  5/2008  Asch ............... C08G 77/48
                                            528/31
7,429,636 B2 *  9/2008  Asch ............... C09D 4/00
                                            528/31
7,432,338 B2 * 10/2008  Chapman ......... C08G 77/50
                                            528/31
7,592,412 B2 *  9/2009  Cray .............. C09D 183/04
                                            528/21
7,906,605 B2    3/2011  Cray et al.
8,685,499 B2    4/2014  Martin et al.
8,722,153 B2    5/2014  Ekeland
8,747,997 B2    6/2014  Heilman et al.
9,275,560 B2    3/2016  Zhang et al.
9,388,284 B2 *  7/2016  Liu ................. C08L 83/00
2003/0139287 A1* 7/2003  Deforth ............ C08L 83/04
                                            502/202
2003/0228473 A1* 12/2003 Benayoun .......... C09D 183/08
                                            428/447
2004/0127668 A1* 7/2004  Rubinsztajn ....... C08G 77/06
                                            528/12
2006/0041098 A1* 2/2006  Kennedy .......... C08G 77/06
                                            528/25
2006/0116500 A1   6/2006  Chapman et al.
2007/0167563 A1   7/2007  Cray et al.
2007/0289495 A1  12/2007  Cray et al.
2008/0276836 A1  11/2008  Schlitzer et al.
2012/0064022 A1*  3/2012  Wray ............... C08L 83/14
                                            424/70.12
2014/0350176 A1* 11/2014 Fisher .............. A61L 15/58
                                            524/588
2014/0350278 A1* 11/2014 Fisher .............. C08G 77/46
                                            556/446
2017/0218133 A1   8/2017  Ihara
2020/0384670 A1* 12/2020 Paillot ............. C10M 169/044

FOREIGN PATENT DOCUMENTS

WO    2008140762 A2    11/2008

OTHER PUBLICATIONS

International Search Report for PCT/US2020/062827 dated Mar. 19, 2021, 4 pages.

* cited by examiner

Primary Examiner — Robert S Loewe
(74) Attorney, Agent, or Firm — Warner Norcross + Judd LLP

(57) ABSTRACT

A method of preparing a composition for forming a release coating is disclosed. The method comprises preparing a reaction product comprising a polyorganohydrogensiloxane compound having cyclic SiH-functional branching groups interconnected by linear polydiorganosiloxane segments (the "branched cyclic polyorganohydrogensiloxane compound"), by combining together (A) a hydroxyl terminated polydiorganosiloxane and (B) a cyclic polyorganohydrogensiloxane, in the presence of (C) a boron containing Lewis acid and a solvent. A release coating composition including the reaction product comprising the branched cyclic polyorganohydrogensiloxane is also disclosed. The reaction product may be combined with or prepared in the presence of a polyorganohydrogensiloxane diluent and stripped of solvent to prepare the composition as a blend of the branched cyclic polyorganohydrogensiloxane and the polyorganohydrogensiloxane diluent for use in solventless-curable compositions.

18 Claims, No Drawings

COMPOSITION FOR PREPARING A RELEASE COATING

CROSS REFERENCE TO RELATED APPLICATIONS

This application is the National Stage of International Application No. PCT/US2020/062827 filed on 2 Dec. 2020, which claims priority to and all advantages of U.S. Provisional Patent Application No. 62/942,687 filed on 2 Dec. 2019, the content of which is incorporated herein by reference.

TECHNICAL FIELD

The present disclosure generally relates generally relates to a composition and, more specifically, to an additive composition for a release coating composition, the release coating composition, and related methods.

BACKGROUND

Silicone compositions are known in the art and utilized in myriad industries and end use applications. One such end use application is to form release coatings or liners from which adhesives can be removed. For example, silicone compositions may be utilized to coat various substrates, such as paper, to give release liners for laminating pressure sensitive adhesives (e.g. tapes). Such silicone compositions are typically addition-curable.

Conventional release liners are typically formed by addition reacting (or hydrosilylating) an organopolysiloxane having an unsaturated hydrocarbon group and an organohydrogenpolysiloxane in the presence of a hydrosilylation reaction catalyst. In certain applications, release liners are formed at high speeds via a coating process. However, during such processes of preparing release liners, mists often form. It is desirable to minimize formation of such mists without impacting performance properties of the release liners.

BRIEF SUMMARY

A method of preparing an additive composition for a release coating composition (the "preparation method") is disclosed. The preparation method comprises preparing a polyorganohydrogensiloxane compound having cyclic SiH-functional branching groups interconnected by linear polydiorganosiloxane segments (the "branched cyclic polyorganohydrogensiloxane compound"), by reacting together: (A) a hydroxyl terminated polydiorganosiloxane of formula

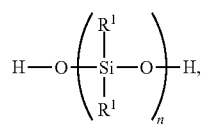

where subscript n is 2 to 2,000 and each $R^1$ is independently selected from the group consisting of monovalent hydrocarbon groups and monovalent halogenated hydrocarbon groups; and (B) a cyclic polyorganohydrogensiloxane of formula $(RHSiO_{2/2})_v$, where subscript v is 3 to 12 and each R is an independently selected monovalent hydrocarbon group; in the presence of (C) a boron containing Lewis acid. In certain embodiments, the preparation method also comprises combining the branched cyclic polyorganohydrogensiloxane compound with (D) a polyorganohydrogensiloxane diluent having the formula $H_xR_{3-x}SiO(SiR_2O)_y(SiRHO)_z SiR_{3-x'}H_{x'}$, where R is defined above, subscripts x and x' are each independently 0 or 1, subscript y is from 0 to 250, and subscript z is from 0 to 250, with the proviso that $y+z \geq 1$.

A composition for forming a release coating (the "release coating composition") is also disclosed. The release coating composition comprises the additive composition, an organopolysiloxane including at least two silicon-bonded ethylenically unsaturated groups, and a hydrosilylation catalyst. A method of preparing the release coating composition is also disclosed.

A method of preparing a coated substrate comprising a release coating disposed on a substrate (the "coating method"), as well as the coated substrate formed in accordance with the coating method, are also disclosed.

DETAILED DESCRIPTION OF THE INVENTION

A method of preparing an additive composition comprising a polyorganohydrogensiloxane compound having cyclic SiH-functional branching groups interconnected by linear polydiorganosiloxane segments (the "branched cyclic polyorganohydrogensiloxane compound"), is provided. The branched cyclic polyorganohydrogensiloxane compound is useful in curable compositions, such as release coating compositions.

The preparation method comprises preparing the branched cyclic polyorganohydrogensiloxane compound by reacting together: (A) a hydroxyl terminated polydiorganosiloxane of formula

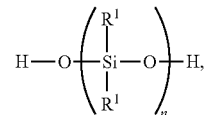

where subscript n is 2 to 2,000 and each $R^1$ is independently selected from the group consisting of monovalent hydrocarbon groups and monovalent halogenated hydrocarbon groups; and (B) a cyclic polyorganohydrogensiloxane of formula $(RHSiO_{2/2})_v$, where subscript v is 3 to 12 and each R is an independently selected monovalent hydrocarbon group; in the presence of (C) a boron containing Lewis acid.

The hydroxyl terminated polydiorganosiloxane (A), cyclic polyorganohydrogensiloxane (B), and boron containing Lewis acid (C) are described in turn below, along with additional components that may be utilized in the preparation method, which may be collectively referred to herein as the "components" of the preparation method (i.e., "component (A)", "component (B)", "component (C)", etc., respectively.).

As introduced above, component (A) is a hydroxyl terminated polydiorganosiloxane of formula

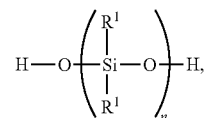

where subscript n is 2 to 2,000 and each $R^1$ is independently selected from the group consisting of monovalent hydrocarbon groups and monovalent halogenated hydrocarbon groups.

With regard to the formula of component (A) above, subscript n is from 2 to 2,000, inclusive. In certain embodiments, subscript n is from 2 to 1000, such as from 2 to 750, alternatively from 2 to 500, alternatively from 30 to 500, alternatively from 50 to 500, alternatively from 100 to 500. In some embodiments, subscript n is from 30 to 2000, alternatively from 50 to 2000, alternatively from 100 to 2000, alternatively from 100 to 1000. In certain embodiments, subscript n may have a value such that $2 \leq n \leq 1,000$, alternatively $5 \leq n \leq 900$, alternatively $5 \leq n \leq 50$, and alternatively $5 \leq n \leq 15$. In specific embodiments, subscript n is an average value of from 2 to 20, such as from 2 to 18, alternatively from 4 to 18, alternatively from 4 to 16, alternatively from 6 to 16, alternatively from 6 to 14, alternatively from 8 to 14, alternatively from 8 to 12, per molecule of hydroxyl terminated polydiorganosiloxane.

With continued regard to the formula of component (A) above, each $R^1$ is independently a monovalent hydrocarbon group or a monovalent halogenated hydrocarbon group (i.e., an unsubstituted or halo-substituted hydrocarbyl group). Suitable hydrocarbyl groups may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, octenyl, hexadecenyl, octadecenyl and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In certain embodiments, each $R^1$ is independently selected from alkyl groups having from 1 to 20 carbon atoms (e.g. methyl, ethyl, and propyl groups (i.e., n-propyl and isopropyl groups), etc.), alkenyl groups having from 2 to 20 carbon atoms (e.g. vinyl, allyl, and hexenyl groups, etc.), aryl groups having from 6 to 20 carbon atoms (e.g. phenyl groups, etc.), and halogenated alkyl groups having from 1 to 20 carbon atoms (e.g. chloromethyl, chloropropyl, and trifluoropropyl groups, etc.). In specific embodiments, each $R^1$ is independently selected from the group consisting of methyl, vinyl, phenyl, and trifluoropropyl groups.

Hydroxyl terminated polydiorganosiloxanes suitable for use as component (A) may be prepared by methods known in the art, such as hydrolysis and condensation of the corresponding organohalosilanes or equilibration of cyclic polydiorganosiloxanes. Exemplary hydroxyl terminated polydiorganosiloxanes are hydroxyl terminated polydimethylsiloxanes. Suitable hydroxyl terminated polydimethylsiloxanes are also commercially available, e.g. from Dow Silicones Corporation of Midland, Mich., USA or from Gelest, Inc. of Morrisville, Pa., USA, including those designated or otherwise referred to as DMS-S12, DMS-S14, DMS-S15, DMS-S21, DMS-S27, DMS-S41, DMS-S32, DMS-S33, DMS-S35, DMS-S42, and DMS-S45.

As introduced above, component (B) is a cyclic polyorganohydrogensiloxane of formula $(RHSiO_{2/2})_v$, where subscript v is 3 to 12 and each R is an independently selected monovalent hydrocarbon group. Monovalent hydrocarbon groups are described above for $R^1$.

With regard to the formula of component (B) above, subscript v is from 3 to 12, such that the cyclic polyorganohydrogensiloxane has from 3-12 siloxy units in the cyclic structure of the polyorganohydrogensiloxane. In certain embodiments, subscript v is from 4 to 10, such as from 4 to 8, alternatively from 4 to 6. In certain embodiments, subscript v may have an average value of from 4 to 10, such as an average value of from 4 to 8, alternatively from 4 to 6, alternatively from 4 to 5, alternatively of 4.

With continued regard to the formula of component (B) above, R is independently selected from monovalent hydrocarbon groups in each unit indicated by subscript v. Examples of suitable hydrocarbon groups for R include the hydrocarbyl groups described with respect to $R^1$ above. In certain embodiments, each R is independently selected from alkyl groups having from 1 to 6 carbon atoms. In these or other embodiments, each R is independently selected from methyl, ethyl, and propyl.

In specific embodiments, each R is methyl, and the cyclic polyorganohydrogensiloxane (B) has the following formula:

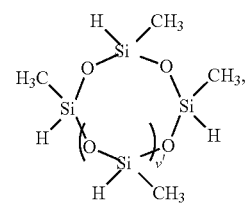

where v'=v−3 (i.e., v' is from 0 to 9). In some such embodiments, v' is from 1 to 3, such as 1, 2, or 3. In certain embodiments, v' has an average value of from 1-3, such as an average value of 1, 2, or 3.

Examples of suitable cyclic polyorganohydrogensiloxanes for component (B) include tetramethylcyclotetrasiloxane, pentamethylcyclopentasiloxane, hexamethylcyclohexasiloxane, and combinations of two or more thereof. Suitable cyclic polyorganohydrogensiloxanes are known in the art and are commercially available, e.g. from Dow Silicones Corporation of Midland, Mich., USA.

As introduced above, component (C) is a boron containing Lewis acid. Without implying any type of particular or limited function of the boron containing Lewis acid, component (C) may also be referred to herein as the "catalyst (C)". Examples of suitable boron containing Lewis acids include trivalent boron compounds, such as those of general formula $B(X)_3$, where each X is independently $R^1$, halogen atom (e.g. Cl, Br, F), a hydroxyl group, or an alkoxyl group of formula $—OR^1$, and $R^1$ is as defined above. In some embodiments, component (C) is a trivalent boron compound with at least one perfluoroaryl group per molecule, such as from 1 to 3, alternatively from 2 to 3, alternatively 3 perfluoroaryl groups per molecule. In such embodiments, the perfluoroaryl groups may have from 6 to 12 carbon atoms, such as from 6 to 10, alternatively 6 carbon atoms.

In some embodiments, the boron containing Lewis Acid may be selected from the group consisting of $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; $(C_6F_5)_2B—CH_2CH_2Si(CH_3)$, and combinations thereof. In specific embodiments, the boron containing Lewis acid catalyst is tris(pentafluorophenyl)borane of formula $B(C_6F_5)_3$.

Suitable boron containing Lewis acids are commercially available, e.g. from Millipore Sigma of St. Louis, Mo., USA. The amount of component (C) will depend on the type and amount of other starting materials used (e.g. amount of component (A), amount of component (B), ratio of (A):(B), etc.). In some embodiments, component (C) may be present in an amount of from 50 ppm to 6000 ppm based on combined weights of components (A), (B), and (C) utilized in the preparation method. In certain embodiments, component (C) is utilized in an amount of from 50 ppm to 600 ppm, based on combined weights of components (A), (B), and (C) utilized.

The amounts of components (A) and (B) utilized depend on various factors, including the OH content of component (A) and the silicon-bonded hydrogen (SiH) content of component (B). In certain embodiments, components (A) and (B) are utilized in amounts sufficient to provide a molar ratio of OH in component (A) to SiH in component (B) (OH:SiH ratio) of from 1:2 to 1:40, such as from 1:4 to 1:30; alternatively of from 1:5 to 1:20, alternatively of from 1:5 to 1:10 OH:SiH. In some embodiments, components (A) and (B) are utilized in amounts sufficient to provide a weight ratio of component (A) to (B) (wt./wt.) of from 2:1 to 40:1, such as from 4:1 to 30:1; alternatively of from 5:1 to 20:1, alternatively of from 5:1 to 10:1 (A):(B).

The components for preparing the branched cyclic polyorganohydrogensiloxane compound (i.e., components (A), (B), and (C)) may be independently utilized in any form, such as neat (i.e., absent solvents, carrier vehicles, dispersants, etc., or disposed in a carrier vehicle, such as a solvent or diluent, as described further below. When utilized, the carrier vehicle will be selected based on the particular components (A), (B), and (C) selected. It will be appreciated that components any of components (A), (B), and (C) may be combined with the carrier vehicle, if utilized, prior to, during, or after being combined with any other of the components. In certain embodiments, one or more of components (A), (B), and (C) are free from, alternatively substantially free from carrier vehicles, prior to being combined with one or more other of the components.

In certain embodiments, preparing the branched cyclic polyorganohydrogensiloxane compound comprises combining components (A), (B), and (C) in the presence of a solvent. The solvent may facilitate introduction of certain starting materials, such as component (C) the boron containing Lewis acid. Solvents used herein are those that help fluidize the starting materials (i.e., components (A), (B), and (C)) but essentially do not react with any of these starting materials. Solvent will be selected based on solubility of the starting materials, the volatility (i.e., vapor pressure of the solvent), the parameters of the preparation method employed, etc. The solubility refers to the solvent being sufficient to dissolve and/or disperse components (A), (B), and (C).

In certain embodiments, the solvent is a hydrocarbon solvent. Examples of hydrocarbon solvents include aromatic hydrocarbons (e.g. benzene, toluene, xylenes, etc.), aliphatic hydrocarbons (e.g. heptane, hexane, octane, etc.), halogenated hydrocarbons (e.g. dichloromethane, 1,1,1-trichloroethane, methylene chloride, etc.), and the like, as well as, derivatives, modifications, and combinations thereof.

The amount of solvent can depend on various factors, including the type of solvent selected, the amount and type of components (A), (B), and (C) employed, etc. Typically, the amount of solvent may range from 0.1 to 99 wt. %, based on combined weights of components (A), (B), and (C). In some embodiments, the solvent is utilized in an amount of from 1 to 99 wt. %, such as from 2 to 99, alternatively of from 2 to 95, alternatively of from 2 to 90, alternatively of from 2 to 80, alternatively of from 2 to 70, alternatively of from 2 to 60, alternatively of from 2 to 50 wt. %, based on combined weights of components (A), (B), and (C).

Combining components (A) and (B) in the presence of (C) prepares the branched cyclic polyorganohydrogensiloxane compound. As will be understood in view of the description herein, the branched cyclic polyorganohydrogensiloxane comprises cyclic SiH-functional branching groups (i.e., siloxane rings derived from component (B)) interconnected by linear polydiorganosiloxane segments (i.e., derived from component (A)).

For example, in certain embodiments, the branched cyclic polyorganohydrogensiloxane compound has the following average unit formula:

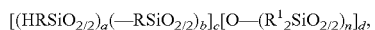

where subscript a is from 0 to 10; subscript b is from 1 to 4, with the proviso that a+b=v; 0<c<1; and 0<d<1, with the proviso that c>d, and where R, $R^1$, and v are as defined above. In this unit formula, the moieties indicated by subscript c are cyclic branching groups derived from the cyclic polyorganohydrogensiloxane (B), moieties indicated by subscript d are linear segments derived from the hydroxyl terminated polydiorganosiloxane (A). More specifically, the siloxy units indicated by subscript b represent branching groups, which are part of the backbone of the cyclic branching groups and bonded to the linear segments. As such, it is to be appreciated that the branched cyclic polyorganohydrogensiloxane compound may also be represented by the following average unit formula:

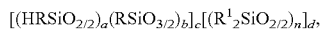

where the siloxy units indicated by subscript b are instead indicated as T siloxy units, as opposed to D siloxy units as in the previous average unit formula. In either case, it is to be understood that the branched cyclic polyorganohydrogensiloxane compound comprises cyclic groups linked together by linear segments, as described above.

The number of cyclic branching groups and linear segments, as well as the ratio therebetween, may vary. Typically, the branched cyclic polyorganohydrogensiloxane compound comprises an average of least three moieties indicated by subscript c (i.e., cyclic branching groups). However, the branched cyclic polyorganohydrogensiloxane compound may have an average of more than three cyclic branching groups per molecule. It is to be understood that subscripts c and d as used in the average unit formulas above may each be representative of mole fractions, such that $c+d=1$. However, in certain embodiments subscripts c and d may instead represent the particular number of cyclic groups and linear segments, respectively, in the branched cyclic polyorganohydrogensiloxane compound. For example, in certain embodiments, subscript c is from 2 to 100, such as from 3 to 100, alternatively from 3 to 50, alternatively from 3 to 25, alternatively from 4 to 25. In these or other embodiments, subject to the provisos above, subscript d is from 1 to 100, such as from 2 to 99, alternatively from 2 to 50, alternatively from 2 to 25, alternatively from 3 to 25. In specific embodiments, subscript c may be from 3 to 15, such as from 3 to 10, alternatively of from 3 to 8, alternatively of from 4 to 8. In these or other embodiments, subscript d is from 2 to 14, such as from 2 to 9, alternatively of from 2 to 7, alternatively of from 3 to 7.

In certain embodiments, the preparation method also comprises combining the branched cyclic polyorganohydrogensiloxane compound with (D) a polyorganohydrogensiloxane diluent having the formula $H_xR_{3-x}SiO(SiR_2O)_y(SiRHO)_zSiR_{3-x'}H_{x'}$, where R is defined above, subscripts x and x' are each independently 0 or 1, subscript y is from 0 to 250, and subscript z is from 0 to 250, with the provisos that $y+z \geq 1$ and when $z=0$, x and x' are both 1. The polyorganohydrogensiloxane diluent (D) may also be referred to herein as the "diluent (D)" or "component (D)").

As will be appreciated from the formula for component (D) above, the diluent comprises, alternatively is, a linear polyorganohydrogensiloxane having an average of at least two silicon-bonded hydrogen atoms per molecule. As such, the diluent (D) is useful as a cross-linker, and reacts with the ethylenically unsaturated groups of other compounds and/or components, e.g. when forming a coating (e.g. a release coating) therewith.

With regard to the formula of component (D) above, subscripts y and z are independently from 0 to 100. In certain embodiments, subscripts y and z are independently from 0 to 100, alternatively from 0 to 50, alternatively from 0 to 30. In specific embodiments, $y+z=250$, alternatively 100, alternatively 75, alternatively 50, alternatively 30. In particular embodiments, one of subscript y and z is 0, and the other is an average value of from 1 to 100, alternatively from 1 to 50, alternatively from 1 to 30. In specific embodiments, one of subscript y and z is 0, and the other is an average value of from 2 to 100, alternatively from 2 to 50, alternatively from 2 to 30, alternatively from 5 to 30.

In certain embodiments, the polyorganohydrogensiloxane of the diluent (D) includes pendent silicon-bonded hydrogen atoms. In such embodiments, the (polyorganohydrogensiloxane may be a dimethyl, methyl-hydrogen polysiloxane having the average formula;

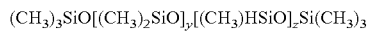

where subscripts y and z are defined above. One of skill in the art understands that in the exemplary formula above, the dimethylsiloxy units indicated by subscript y and methylhydrogensiloxy units indicated by subscript z may be present in randomized or block form, and that any methyl group may be replaced with any other hydrocarbon group free of aliphatic unsaturation (i.e., such that the methyl groups shown are to be understood as representative of other suitable groups defined above with respect to R).

In some embodiments, the polyorganohydrogensiloxane of the diluent (D) includes terminal silicon-bonded hydrogen atoms. In these embodiments, the polyorganohydrogensiloxane may be an SiH terminal dimethyl polysiloxane having the average formula:

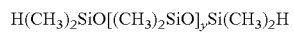

where subscript y is as defined above. The SiH terminal dimethyl polysiloxane may be utilized alone or in combination with the dimethyl, methyl-hydrogen polysiloxane described above. When the diluent (D) comprises such a mixture, the relative amount of each organohydrogensiloxane in the mixture may vary. One of skill in the art understands that any methyl group in the exemplary formula above may also be replaced with any other hydrocarbon group free of aliphatic unsaturation, as described above.

In specific embodiments, the polyorganohydrogensiloxane of the diluent (D) includes both pendent and terminal silicon-bonded hydrogen atoms.

Particular examples of suitable polyorganohydrogensiloxanes suitable for us in, or as, the diluent (D) include the following: dimethylhydrogensiloxy-terminated poly(dimethyl/methylhydrogen)siloxane copolymer; dimethylhydrogensiloxy-terminated polymethylhydrogensiloxane; trimethylsiloxy-terminated poly(dimethyl/methylhydrogen) siloxane copolymer; trimethylsiloxy-terminated polymethylhydrogensiloxane; and combinations thereof. Suitable polyorganohydrogensiloxanes are commercially available from Dow Silicones Corporation of Midland, Mich., USA. Other examples of suitable polyorganohydrogensiloxanes suitable for us in, or as, the diluent (D) include those described below with respect to certain organosilicon compounds meeting the requirements and provisos set forth above.

The diluent (D) may comprise a combination or two or more different organohydrogensiloxanes that differ in at least one property such as structure, molecular weight, monovalent groups bonded to silicon atoms and content of silicon-bonded hydrogen atoms. The composition may comprise the diluent (D) in any amount, which will be selected based on the type and/or amount of the branched cyclic polyorganohydrogensiloxane compound utilized, a desired endues of the additive composition, etc. For example, in certain embodiments, the diluent (D) is utilized in an amount to give a molar ratio of silicon-bonded hydrogen atoms in organohydrogensiloxanes to silicon-bonded ethylenically unsaturated groups in another component (such as described below) in an amount of from 1:1 to 5:1, alternatively from 1.1:1 to 3.1.

As introduced above, the preparation method may comprise combining the branched cyclic polyorganohydrogensiloxane compound with the polyorganohydrogensiloxane diluent (D). However, in certain embodiments, the branched cyclic polyorganohydrogensiloxane compound is prepared in the presence of the (D) organopolysiloxane diluent to give the additive composition. As such, it is to be appreciated that components (A) and (B) may be combined in the presence of component (C) for a period of time to prepare the branched cyclic polyorganohydrogensiloxane compound, which is then combined with the (D) organopolysiloxane diluent. Alternatively, components (A) and (B) may be combined in the presence of component (C) and the diluent (D), such that the branched cyclic polyorganohydrogensiloxane compound is prepared in a mixture comprising the diluent (D).

In certain embodiments, components (A) and (B) are combined in the presence of component (C) and the solvent for a period of time to prepare a reaction mixture comprising the branched cyclic polyorganohydrogensiloxane compound in the solvent. In some such embodiments, the diluent (D) may also be present in the reaction mixture, i.e., as the branched cyclic polyorganohydrogensiloxane compound is being prepared. In other such embodiments, the reaction mixture comprising the branched cyclic polyorganohydrogensiloxane compound in the solvent is combined with the diluent (D). In either of such embodiments, the preparation method may further include removing the solvent from the reaction mixture (e.g. via stripping) to give the additive composition comprising the branched cyclic polyorganohydrogensiloxane compound and diluent as a solventless composition (i.e., free from, alternatively substantially free from, the solvent). The additive composition so prepared is useful in solventless compositions, such as solventless release coating compositions, as described below.

One or more steps of the preparation method may be performed at a temperature of from 5 to 75° C., such as from 5 to 75, alternatively from 5 to 70, alternatively from 10 to 70, alternatively from 15 to 70, alternatively from 20 to 70, alternatively from 20 to 60, alternatively from 20 to 50, alternatively from 20 to 35, alternatively from 20 to 30° C. For example, in certain embodiments, preparing the branched cyclic polyorganohydrogensiloxane compound comprises combining components (A), (B), and (C) to form a reaction mixture, and heating/holding the reaction mixture at a temperature of from 5 to 70° C., such as from 5 to 65, alternatively from 10 to 60, alternatively from 15 to 50, alternatively from 20 to 35° C. Without wishing to be bound by theory, it is thought that performing the method, particularly step 1) at relatively low temperatures (e.g. ≤90° C., alternatively ≤80° C., alternatively ≤70° C., alternatively ≤50° C.) may provide improved reaction rate, yield, or both.

One or more of the components utilized in preparing the branched cyclic polyorganohydrogensiloxane compound (i.e., components (A), (B), and (C), the solvent, and the diluent (D), if present during the reaction) may be free of, alternatively substantially free of platinum group metal catalysts. "Free of" as used herein includes none, alternatively an amount non-detectable by GC, and alternatively an amount insufficient to cause performance problems of release coatings prepared from release coating compositions including the branched cyclic polyorganohydrogensiloxane compound made by the method described herein.

The additive composition may be combined with other components to give a composition that is curable (e.g. via hydrosilylation), i.e., a "curable composition", which can subsequently be cured to give a release coating (e.g. for release coatings or liners).

The particular form of the additive composition will determine the type of other components selected, the type of curable composition to be formed, etc. For example, in certain embodiments, the additive composition consists essentially of, alternatively consists of, the branched cyclic polyorganohydrogensiloxane compound and the diluent (D), i.e., in a solventless form. In such embodiments, the additive composition may be utilized to prepare solventless release coatings and other compositions where solvent is not desired/preferred. In other embodiments, the reaction mixture comprising the branched cyclic polyorganohydrogensiloxane compound and the solvent is prepared or combined with the diluent (D), thus preparing the additive composition as a solvent-based composition. In such embodiments, one or more additional components (e.g. such as the polymer/resin component described below) may be combined with the solvent-based additive composition to prepare a solvent-based curable composition. In some such embodiments, the additive composition may be formulated with additional components in an oil or silicone phase for preparing a bi-phasic composition, such as an emulsion, as described in further detail below. Alternatively, such additional components may be combined with the solvent-based additive composition, and the solvent subsequently removed, to prepare a base composition for preparing solventless coating compositions, such as those described above, but without the diluent (D).

It will be appreciated that the presence or absence of the diluent (D) will influence not only solvent-compatibility of the additive composition as described above, but will also impact the viscosity of the additive composition. In particular, the presence of the diluent provides the additive composition as a low-viscosity composition suitable for solventless applications. The absence of the diluent provides the additive composition as a high-viscosity composition suitable for solvent-based applications, unless combined with another functional component and then stripped of solvent. In the latter case, the additive composition will be provided as a high-viscosity composition for solventless applications.

As introduced above, the curable composition may be prepared by combining together one or more additional components with the additive composition. The curable composition may be formulated as a composition for preparing a release coating (i.e., a release coating composition).

In general, the curable composition comprises: (I) the additive composition described above; (II) an organopolysiloxane including at least two silicon-bonded ethylenically unsaturated groups; and (III) a hydrosilylation catalyst. The additional components are described in turn below, and may be referred to simply as "component (II)", component (III)", etc.

When the curable composition consists essentially of, alternatively consists of, components (I) and (II), i.e., in the absence of any catalyst or cross-linker, the composition may be referred to as a "base composition," such as the base composition described above with regard to the diluent-free solvent-based additive composition. The base composition is typically combined with other components to give a composition that is curable, generally via hydrosilylation, which can be cured to give a release coating. Said differently, the base composition is typically combined with other components to give the curable composition, which can be utilize to form release coatings or liners. As such, the term "release coating composition" is used herein to refer to the base composition or the curable composition itself, especially where the curable composition is provided as a multi-part composition (i.e., where each part may thus be a "release coating composition".

The organopolysiloxane (II) has an average of at least two silicon-bonded ethylenically unsaturated groups per molecule. In certain embodiments, the organopolysiloxane (II) has an average, per molecule, of at least two silicon bonded groups having terminal aliphatic unsaturation. This organopolysiloxane (II) may be linear, branched, partly branched, cyclic, resinous (i.e., have a three-dimensional network), or may comprise a combination of different structures.

In general, the organopolysiloxane (II) may have average formula: $R^4_a SiO_{(4-a)/2}$, where each $R^4$ is independently selected from a monovalent hydrocarbon group or a monovalent halogenated hydrocarbon group, with the proviso that in each molecule, at least two of $R^4$ include aliphatic unsaturation, and where subscript a is selected such that $0<a\leq3.2$. Suitable monovalent hydrocarbon groups and monovalent halogenated hydrocarbon groups for $R^4$ are as described above for $R^1$. The average formula above for the organopolysiloxane (II) may be alternatively written as $(R^4{}_3SiO_{1/2})_b(R^4{}_2SiO_{2/2})_c(R^4SiO_{3/2})_d(SiO_{4/2})_e$, where $R^4$ is defined above, and subscripts b, c, d, and e are each independently from $\geq 0$ to $\leq 1$, with the proviso that a quantity (b+c+d+e)=1. One of skill in the art understands how such M, D, T, and Q units and their molar fractions influence subscript a in the average formula above. T units (indicated by subscript d), Q units (indicated by subscript e) or both, are typically present in polyorganosiloxane resins, whereas D units, indicated by subscript c, are typically present in polyorganosiloxane polymers (and may also be present in polyorganosiloxane resins or branched polyorganosiloxanes).

In certain embodiments, the organopolysiloxane (II) may be substantially linear, alternatively is linear. The substantially linear organopolysiloxane may have the average formula: $R^4{}_{a'}SiO_{(4-a')/2}$, where each $R^4$ and is as defined above, and where subscript a' is selected such that $1.9\leq a'\leq 2.2$.

At 25° C., the substantially linear organopolysiloxane of component (II) may be a flowable liquid or may have the form of an uncured rubber. The substantially linear organopolysiloxane may have a viscosity of from 10 mPa·s to 30,000,000 mPa·s, alternatively from 10 mPa·s to 10,000 mPa·s, alternatively from 100 mPa·s to 1,000,000 mPa·s, and alternatively from 100 mPa·s to 100,000 mPa·s at 25° C. Viscosity may be measured at 25° C. via a Brookfield LV DV-E viscometer with a spindle selected as appropriate to the viscosity of the substantially linear polyorganosiloxane, i.e., RV-1 to RV-7.

When the organopolysiloxane (II) is substantially linear or linear, the organopolysiloxane (II) may have the average unit formula: $(R^6R^5{}_2SiO_{1/2})_{aa}(R^6R_5SiO_{2/2})_{bb}(R^6{}_2SiO_{2/2})_{cc}$ $(R^5{}_3SiO_{1/2})_{dd}$, where each $R^5$ is an independently selected monovalent hydrocarbon group that is free of aliphatic unsaturation or a monovalent halogenated hydrocarbon group that is free of aliphatic unsaturation; each $R^6$ is independently selected from the group consisting of alkenyl and alkynyl; subscript aa is 0, 1, or 2, subscript bb is 0 or more, subscript cc is 1 or more, subscript dd is 0, 1, or 2, with the provisos that a quantity (aa+dd)$\geq$2, and (aa+dd)=2, with the proviso that a quantity (aa+bb+cc+dd) is 3 to 2,000. Alternatively, subscript cc$\geq$0. Alternatively, subscript bb$\geq$2. Alternatively, the quantity (aa+dd) is 2 to 10, alternatively 2 to 8, and alternatively 2 to 6. Alternatively, subscript cc is 0 to 1,000, alternatively 1 to 500, and alternatively 1 to 200. Alternatively, subscript bb is 2 to 500, alternatively 2 to 200, and alternatively 2 to 100.

The monovalent hydrocarbon group for $R^5$ is exemplified by an alkyl group of 1 to 6 carbon atoms, an aryl group of 6 to 10 carbon atoms, a halogenated alkyl group of 1 to 6 carbon atoms, a halogenated aryl group of 6 to 10 carbon atoms, an aralkyl group of 7 to 12 carbon atoms or a halogenated aralkyl group of 7 to 12 carbon atoms, where alkyl, aryl, and halogenated alkyl are as described herein. Alternatively, each $R^5$ is an alkyl group. Alternatively, each $R^5$ is independently methyl, ethyl or propyl. Each instance of $R^5$ may be the same or different. Alternatively, each $R^5$ is a methyl group.

The aliphatically unsaturated monovalent hydrocarbon group for $R^6$ is capable of undergoing hydrosilylation reaction. Suitable aliphatically unsaturated hydrocarbon groups for $R^6$ are exemplified by an alkenyl group as defined herein and exemplified by vinyl, allyl, butenyl, hexenyl, and octenyl; and alkynyl groups as defined herein and exemplified by ethynyl and propynyl. Alternatively, each $R^6$ may be vinyl or hexenyl. Alternatively, each $R^6$ is a vinyl group. The alkenyl or alkynyl content of the organopolysiloxane (II) may be 0.1% to 1%, alternatively 0.2% to 0.5%, based on the weight of the organopolysiloxane (II).

When the organopolysiloxane (II) is substantially linear, alternatively is linear, the at least two aliphatically unsaturated groups may be bonded to silicon atoms in pendent positions, terminal positions, or in both pendent and terminal locations. As a specific example, the organopolysiloxane (II) may have pendant silicon-bonded aliphatically unsaturated groups, and comprise the average formula $[(CH_3)_3SiO_{1/2}]_2$ $[(CH_3)_2SiO_{2/2}]_{cc}[(CH_3)ViSiO_{2/2}]_{bb}$, where subscripts bb and cc are defined above, and Vi indicates a vinyl group. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl). Alternatively, as a specific example of the polyorganosiloxane having an average, per molecule, of at least two silicon-bonded aliphatically unsaturated groups, the organopolysiloxane (II) may have the average formula: $Vi(CH_3)_2SiO[(CH_3)_2SiO]_{cc}Si(CH_3)_2Vi$, where subscript cc and Vi are defined above. The dimethyl polysiloxane terminated with silicon-bonded vinyl groups may be used alone or in combination with the dimethyl, methyl-vinyl polysiloxane disclosed immediately above as the organopolysiloxane (II). With regard to this average formula, any methyl group may be replaced with a different monovalent hydrocarbon group, and any vinyl group may be replaced with any terminally aliphatically unsaturated monovalent hydrocarbon group. Because the at least two silicon-bonded aliphatically unsaturated groups may be both pendent and terminal, the organopolysiloxane (II) may alternatively have the average unit formula:

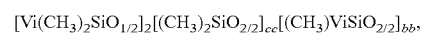

where subscripts bb and cc and Vi are defined above.

When the organopolysiloxane (II) is the substantially linear polyorganosiloxane, the organopolysiloxane (II) can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In certain embodiments, the organopolysiloxane (II) may comprise a substantially linear, alternatively linear, polyorganosiloxane selected from the group consisting of:
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane,
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane), and
xvii) any combination of (i)-(xvi).

In some embodiments, the organopolysiloxane (II) may comprise a resinous polyorganosiloxane. The resinous polyorganosiloxane may have the average formula: $R^4_{a''}SiO_{(4-a'')/2}$, where each $R^4$ is independently selected as defined above, and where subscript a'' is selected such that $0.5 \leq a'' \leq 1.7$.

The resinous polyorganosiloxane has a branched or a three dimensional network molecular structure. At 25° C., the resinous polyorganosiloxane may be in a liquid or in a solid form. Alternatively, the resinous polyorganosiloxane may be exemplified by a polyorganosiloxane that comprises only T units, a polyorganosiloxane that comprises T units in combination with other siloxy units (e.g. M, D, and/or Q siloxy units), or a polyorganosiloxane comprising Q units in combination with other siloxy units (i.e., M, D, and/or T siloxy units). Typically, the resinous polyorganosiloxane comprises T and/or Q units. Specific example of the resinous polyorganosiloxane include a vinyl-terminated silsesquioxane (i.e., T resin) and a vinyl-terminated MDQ resin. In particular embodiments, the (II) organopolysiloxane comprises a branched organopolysiloxane having the silicon-bonded ethylenically unsaturated groups in M siloxy units.

In certain embodiments, the organopolysiloxane (II) may comprise a branched siloxane, a silsesquioxane, or both a branched siloxane and a silsesquioxane.

When the organopolysiloxane (II) comprises a blend of different organopolysiloxanes, the blend may be a physical blend or mixture. For example, when the organopolysiloxane (II) comprises the branched siloxane and the silsesquioxane, the branched siloxane and the silsesquioxane are present in amounts relative to one another such that the amount of the branched siloxane and the amount of the silsesquioxane combined total 100 weight parts, based on combined weights of all components present in the release coating composition. The branched siloxane may be present in an amount of 50 to 100 parts by weight, and the silsesquioxane may be present in an amount of 0 to 50 parts by weight. Alternatively, the branched siloxane may be present in an amount 50 to 90 parts by weight and the silsesquioxane may be present in an amount of 10 to 50 parts by weight. Alternatively, the branched siloxane may be present in an amount of 50 to 80 parts by weight and the silsesquioxane may be present in an amount of 20 to 50 parts by weight. Alternatively, the branched siloxane may be present in an amount of 50 to 76 parts by weight and the silsesquioxane may be present in an amount of 24 to 50 parts by weight. Alternatively, the branched siloxane may be present in an amount of 50 to 70 parts by weight and the silsesquioxane may be present in an amount of 30 to 50 parts by weight.

The branched siloxane of the organopolysiloxane (II) may have unit formula: $(R^7_3SiO_{1/2})_p(R^8R^7_2SiO_{1/2})_q(R^7_2SiO_{2/2})_r(SiO_{4/2})_s$, where each $R^7$ is independently a monovalent hydrocarbon group free of aliphatic unsaturation or a monovalent halogenated hydrocarbon group free of aliphatic unsaturation and each $R^8$ is an alkenyl group or an alkynyl group, both of which are as described above, subscript $p \geq 0$, subscript $q > 0$, $15 \leq r \geq 995$, and subscript s is $> 0$.

In the unit formula immediately above, subscript $p \geq 0$. Subscript $q > 0$. Alternatively, subscript $q \geq 3$. Subscript r is from 15 to 995. Subscript s is $> 0$. Alternatively, subscript $s \geq 1$. Alternatively, for subscript p: $22 \geq p \geq 0$; alternatively $20 \geq p \geq 0$; alternatively $15 \geq p \geq 0$; alternatively $10 \geq p \geq 0$; and alternatively $5 \geq p \geq 0$. Alternatively, for subscript q: $22 \geq q > 0$; alternatively $22 \geq q \geq 4$; alternatively $20 \geq q > 0$; alternatively $15 \geq q > 1$; alternatively $10 \geq q \geq 2$; and alternatively $15 \geq q \geq 4$. Alternatively, for subscript r: $800 \geq r \geq 15$; and alternatively $400 \geq r \geq 15$. Alternatively, for subscript s: $10 \geq s > 0$; alternatively, $10 \geq s \geq 1$; alternatively $5 \geq s > 0$; and alternatively s=1. Alternatively, subscript s is 1 or 2. Alternatively, when subscript s=1, subscript p may be 0 and subscript q may be 4.

The branched siloxane of the organopolysiloxane (II) may contain at least two polydiorganosiloxane chains of formula $(R^7_2SiO_{2/2})_m$, where each subscript m is independently 2 to 100. Alternatively, the branched siloxane may comprise at least one unit of formula $(SiO_{4/2})$ bonded to four polydiorganosiloxane chains of formula $(R^7_2SiO_{2/2})_o$, where each subscript o is independently 1 to 100. Alternatively, the branched siloxane may have formula:

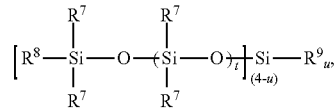

where subscript u is 0 or 1, each subscript t is independently 0 to 995, alternatively 15 to 995, and alternatively 0 to 100; each $R^9$ is an independently selected monovalent hydrocarbon group, each $R^7$ is an independently selected monovalent hydrocarbon group that is free of aliphatic unsaturation or a monovalent halogenated hydrocarbon group that is free of aliphatic unsaturation as described above, and each $R^8$ is independently selected from the group consisting of alkenyl and alkynyl as described above. Suitable branched siloxanes are exemplified by those disclosed in U.S. Pat. No. 6,806,339 and U.S. Patent Publication 2007/0289495.

The silsesquioxane of the organopolysiloxane (II) may have unit formula: $(R^7_3SiO_{1/2})_f(R^8R^7_2SiO_{1/2})_f(R^7_2SiO_{2/2})_g(R^7SiO_{3/2})_h$, where $R^7$ and $R^8$ are as described above, subscript $i\geq 0$, subscript $f>0$, subscript g is 15 to 995, and subscript $h>0$. Subscript i may be 0 to 10. Alternatively, for subscript i: $12\geq i\geq 0$; alternatively $10\geq i\geq 0$; alternatively $7\geq i\geq 0$; alternatively $5\geq i\geq 0$; and alternatively $3\geq i\geq 0$.

Alternatively, subscript $f\geq 1$. Alternatively, subscript $f\geq 3$. Alternatively, for subscript f: $12\geq f>0$; alternatively $12\geq f\geq 3$; alternatively $10\geq f>0$: alternatively $7\geq f>1$: alternatively $5\geq f\geq 2$; and alternatively $7\geq f\geq 3$. Alternatively, for subscript g: $800\geq g\geq 15$; and alternatively $400\geq g\geq 15$. Alternatively, subscript $h\geq 1$. Alternatively, subscript h is 1 to 10. Alternatively, for subscript h: $10\geq h>0$; alternatively $5\geq h>0$; and alternatively $h=1$. Alternatively, subscript h is 1 to 10, alternatively subscript h is 1 or 2. Alternatively, when subscript $h=1$, then subscript f may be 3 and subscript i may be 0. The values for subscript f may be sufficient to provide the silsesquioxane of unit formula (ii-II) with an alkenyl content of 0.1% to 1%, alternatively 0.2% to 0.6%, based on the weight of the silsesquioxane. Suitable silsesquioxanes are exemplified by those disclosed in U.S. Pat. No. 4,374,967.

As introduced above, the organopolysiloxane (II) may comprise a combination or two or more different polyorganosiloxanes that differ in at least one property such as structure, molecular weight, monovalent groups bonded to silicon atoms and content of aliphatically unsaturated groups. The release coating composition may comprise the organopolysiloxane (II) in an amount of from 60 to 99.5, alternatively from 60 to 98, alternatively from 60 to 95, alternatively from 70 to 95, alternatively from 75 to 95, weight percent based on the total weight of the composition. For example, in specific embodiments, the release coating composition comprises the (II) organopolysiloxane in an amount of from 80 to 99 weight percent based on the total weight of the composition.

In certain embodiments, the release coating composition further comprises a hydrosilylation-reaction catalyst (i.e., the "catalyst (III)"). The catalyst (III) is not limited and may be any known hydrosilylation-reaction catalyst for catalyzing hydrosilylation reactions. Combinations of different hydrosilylation-reaction catalysts may be utilized.

In certain embodiments, the catalyst (III) comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the catalyst (III).

Additional examples of catalysts suitable for the catalyst (III) include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the catalyst (III).

The catalyst (III) may be in any suitable form. For example, the catalyst (III) may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The catalyst (III) may be in or on a solid carrier. Examples of carriers include activated carbons, silicas, silica aluminas, aluminas, zeolites and other inorganic powders/particles (e.g. sodium sulphate), and the like. The catalyst (III) may also be disposed in a vehicle, e.g. a solvent which solubilizes the catalyst (III), alternatively a vehicle which merely carries, but does not solubilize, the catalyst (III). Such vehicles are known in the art.

In specific embodiments, the catalyst (III) comprises platinum. In these embodiments, the catalyst (III) is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the catalyst (III) include 1,3-diethenyl-1,1,3,3-tetramethyldisiloxane complexes with platinum. These complexes may be microencapsulated in a resin matrix. Alternatively, the catalyst (III) may comprise 1,3-diethenyl-1,1,3,3-tetramethyldisiloxane complex with platinum. The catalyst (III) may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)PtCl$_2$ with 0.045 mole COD and 0.0612 moles HMeSiCl$_2$.

The catalyst (III) may also, or alternatively, be a photoactivatable hydrosilylation-reaction catalyst, which may initiate curing via irradiation and/or heat. The photoactivatable hydrosilylation-reaction catalyst can be any hydrosilylation-reaction catalyst capable of catalyzing the hydrosilylation reaction, particularly upon exposure to radiation having a wavelength of from 150 to 800 nanometers (nm).

Specific examples of photoactivatable hydrosilylation-reaction catalysts suitable for the catalyst (III) include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as Pt[C$_6$H$_5$NNNOCH$_3$]$_4$, Pt[p-CN—C$_6$H$_4$NNNOC$_6$H$_{11}$]$_4$, Pt[p-H$_3$COC$_6$H$_4$ NNNOC$_6$H$_{11}$]$_4$, Pt[p-CH$_3$(CH$_2$)$_x$—C$_6$H$_4$NNNOCH$_3$]$_4$, 1,5-cyclooctadiene. Pt[p-CN—C$_6$H$_4$NNNOC$_6$H$_{11}$]$_2$, 1,5-cyclooctadiene. Pt[p-CH$_3$O—C$_6$H$_4$NNNOCH$_3$]$_2$, [(C$_6$H$_5$)$_3$P]$_3$Rh [p- CN—C$_6$H$_4$NNNOC$_6$H$_{11}$], and Pd[p-CH$_3$(CH$_2$)$_x$—C$_6$H$_4$NNNOCH$_3$]$_2$, where x is 1, 3, 5, 11, or 17; (η-diolefin)

(σ-aryl)platinum complexes, such as ($\eta^4$-1,5-cyclooctadienyl)diphenylplatinum, $\eta^4$-1,3,5,7-cyclooctatetraenyl)diphenylplatinum, ($\eta^4$-2,5-norboradienyl)diphenylplatinum, ($\eta^4$-1,5-cyclooctadienyl)bis-(4-dimethylaminophenyl)platinum, ($\eta^4$-1,5-cyclooctadienyl)bis-(4-acetylphenyl)platinum, and ($\eta^4$-1,5-cyclooctadienyl)bis-(4-trifluormethylphenyl)platinum. Typically, the photoactivatable hydrosilylation-reaction catalyst is a Pt(II) β-diketonate complex and more typically the catalyst is platinum(II) bis(2,4-pentanedioate).

The catalyst (III) is present in the release coating composition in a catalytic amount, i.e., an amount or quantity sufficient to promote curing thereof at desired conditions. The hydrosilylation-reaction catalyst can be a single hydrosilylation-reaction catalyst or a mixture comprising two or more different hydrosilylation-reaction catalysts.

The catalytic amount of the catalyst (III) may be >0.01 ppm to 10,000 ppm; alternatively >1,000 ppm to 5,000 ppm. Alternatively, the typical catalytic amount of the catalyst (III) is 0.1 ppm to 5,000 ppm, alternatively 1 ppm to 2,000 ppm, alternatively >0 to 1,000 ppm. Alternatively, the catalytic amount of catalyst (III) may be 0.01 ppm to 1,000 ppm, alternatively 0.01 ppm to 100 ppm, alternatively 20 ppm to 200 ppm, and alternatively 0.01 ppm to 50 ppm of platinum group metal; based on the total weight of release coating composition.

The release coating composition may comprise additional components, such as (IV) a hydrosilylation-reaction inhibitor, (V) an anchorage additive, (VI) an anti-mist additive, (VII) a release modifier, (VIII) a vehicle, and/or (VIX) a cross-linker.

In certain embodiments, the release coating composition further comprises the hydrosilylation-reaction inhibitor (i.e., "the inhibitor (IV)"). The inhibitor (IV) may be used for altering the reaction rate or curing rate of the release coating composition, as compared to a composition containing the same starting materials but with the inhibitor (IV) omitted. The inhibitor (IV) is exemplified by acetylenic alcohols such as methyl butynol, ethynyl cyclohexanol, dimethyl hexynol, 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 1-ethynyl-1-cyclohexanol, and combinations thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne; triazoles such as benzotriazole; phosphines; mercaptans; hydrazines; amines, such as tetramethyl ethylenediamine, dialkyl fumarates, dialkenyl fumarates, dialkoxyalkyl fumarates, maleates such as diallyl maleate; nitriles; ethers; carbon monoxide; alkenes such as cyclooctadiene, divinyltetramethyldisiloxane; alcohols such as benzyl alcohol; and a combination thereof. Alternatively, the inhibitor (IV) may be selected from the group consisting of acetylenic alcohols (e.g., 1-ethynyl-1-cyclohexanol) and maleates (e.g., diallyl maleate, bis maleate, or n-propyl maleate) and a combination of two or more thereof.

In some embodiments, the inhibitor (IV) may be a silylated acetylenic compound. Without wishing to be bound by theory, it is thought that adding a silylated acetylenic compound reduces yellowing of the reaction product prepared from hydrosilylation reaction of the release coating composition as compared to a reaction product from hydrosilylation of a composition that does not contain a silylated acetylenic compound or that contains an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the inhibitor (IV) is exemplified by methyl(tris(1,1-dimethyl-2-propynyloxy))silane, ((1,1-dimethyl-2-propynyl)oxy)trimethylsilane, or a combination thereof. The silylated acetylenic compound useful as the (inhibitor (IV) may be prepared by methods known in the art, such as silylating an acetylenic alcohol described above by reacting it with a chlorosilane in the presence of an acid receptor.

The amount of the inhibitor (IV) present in the release coating composition will depend on various factors including the desired pot life of the composition, whether the release coating composition will be a one part release coating composition or a multiple part release coating composition, the particular inhibitor used, and the selection and amount of components (I)-(VIII). However, when present, the amount of the inhibitor (IV) may be 0% to 1%, alternatively 0% to 5%, alternatively 0.001% to 1%, alternatively 0.01% to 0.5%, and alternatively 0.0025% to 0.025%, based on the total weight of the composition.

In certain embodiments, the release coating composition further comprises the anchorage additive (V). Suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Alternatively, the anchorage additive may comprise a polyorganosilicate resin. Suitable anchorage additives and methods for their preparation are disclosed, for example, in U.S. Pat. No. 9,562,149; U.S. Patent Application Publication Numbers 2003/0088042, 2004/0254274, and 2005/0038188; and European Patent 0 556 023.

Further examples of suitable anchorage additives include a transition metal chelate, a hydrocarbonoxysilane such as an akoxysilane, a combination of an alkoxysilane and a hydroxy-functional polyorganosiloxane, or a combination thereof. The anchorage additive (V) may be a silane having at least one substituent having an adhesion-promoting group, such as an epoxy, acetoxy or acrylate group. The adhesion-promoting group may additionally or alternatively be any hydrolysable group which does not impact the catalyst (III). Alternatively, the anchorage additive (V) may comprise a partial condensate of such a silane, e.g. an organopolysiloxane having an adhesion-promoting group. Alternatively still, the anchorage additive (V) may comprise a combination of an alkoxysilane and a hydroxy-functional polyorganosiloxane.

In some embodiments, the anchorage additive (V) may comprise an unsaturated or epoxy-functional compound. The (anchorage additive (V) may comprise an unsaturated or epoxy-functional alkoxysilane. For example, the functional alkoxysilane can include at least one unsaturated organic group or an epoxy-functional organic group. Epoxy-functional organic groups are exemplified by 3-glycidoxypropyl and (epoxycyclohexyl)ethyl. Unsaturated organic groups are exemplified by 3-methacryloyloxypropyl, 3-acryloyloxypropyl, and unsaturated monovalent hydrocarbon groups such as vinyl, allyl, hexenyl, undecylenyl. One specific example of an unsaturated compound is vinyltriacetoxysilane.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

The anchorage additive (V) may also comprise the reaction product or partial reaction product of one or more of these compounds. For example, in a specific embodiment, the anchorage additive (V) may comprise the reaction product or partial reaction product of vinyltriacetoxysilane and 3-glycidoxypropyltrimethoxysilane. Alternatively or in addition, the anchorage additive (V) may comprise alkoxy or alkenyl functional siloxanes.

In certain embodiments, the anchorage additive (V) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The anchorage additive (V) may comprise a combination of an epoxy-functional alkoxysilane and an epoxy-functional siloxane. For example, the anchorage additive (V) is exemplified by a mixture of 3-glycidoxypropyltrimethoxysilane and a reaction product of hydroxy-terminated methylvinylsiloxane with 3-glycidoxypropyftrmethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

In some embodiments, the anchorage additive (V) may comprise a transition metal chelate. Suitable transition metal chelates include titanates, zirconates such as zirconium acetylacetonate, aluminum chelates such as aluminum acetylacetonate, and combinations thereof. Alternatively, the anchorage additive (V) may comprise a combination of a transition metal chelate with an alkoxysilane, such as a combination of glycidoxypropyltrimethoxysilane with an aluminum chelate or a zirconium chelate.

The particular amount of the anchorage additive (V) present in the release coating composition, if utilized, depends on various factors including the type of substrate and whether a primer is used. In certain embodiments, the anchorage additive (V) is present in the composition in an amount of from 0 to 2 parts by weight, per 100 parts by weight of component (II). Alternatively, the anchorage additive (V) is present in the composition in an amount of from 0.01 to 2 parts by weight, per 100 parts by weight of component (II).

In certain embodiments, the release coating composition further comprises the anti-mist additive (VI). The anti-mist additive (VI) is distinguished from component (I), which may also serve as an anti-mist additive when the composition is utilized to prepare a release coating. The anti-mist additive (VI) may be utilized in the composition to reduce or suppress silicone mist formation in coating processes, particularly with high speed coating equipment. The anti-mist additive (VI) may be a reaction product of an organohydrogensilicon compound, an oxyalkylene compound or an organoalkenylsiloxane with at least three silicon bonded alkenyl groups per molecule, and a suitable catalyst. Suitable anti-mist additives are disclosed, for example, in U.S. Patent Application 2011/0287267; U.S. Pat. Nos. 8,722,153; 6,586,535; and 5,625,023.

The amount of the anti-mist additive (VI) utilized in the release coating composition will depend on various factors including the amount and type of other starting materials selected for the composition. However, the anti-mist additive (VI) is typically utilized in an amount of from 0% to 10%, alternatively 0.1% to 3%, based on the total weight of the composition. This amount excludes that associated with component (I), and only relates to the anti-mist additive (VI) that is separate and distinct from component (I).

In certain embodiments, the release coating composition further comprises the release modifier (VII), which may be utilized in the composition to control (decrease) the level of release force (the adhesive force between the release coating formed from the composition and an adherend thereto, such as a label including a pressure sensitive adhesive). Release coatings having the required or desired release force can be formulated from a modifier-free composition by adjusting the level or concentration of the release modifier (VII). Examples of suitable release modifiers for component (VII) include trimethylsiloxy-terminated dimethyl, phenylmethylsiloxanes. Alternatively, the release modifier (VII) may be a condensation reaction product of an organopolysiloxane resin having hydroxyl or alkoxy groups and a diorganopolysiloxane with at least one hydroxyl or hydrolyzable group. Examples of suitable release modifiers are disclosed, for example, in U.S. Pat. No. 8,933,177 and U.S. Patent Application Publication 2016/0053056. When utilized, the release modifier (VII) can be present in the release coating composition in an amount of from 0 to 85 parts by weight, alternatively 25 to 85 parts, per 100 parts of component (II).

In certain embodiments, the release coating composition further comprises the vehicle (VIII). The vehicle (VIII) typically solubilizes the components of the release coating composition and, if the components solubilize, the vehicle (VIII) may be referred to as a solvent. Suitable vehicles include silicones, both linear and cyclic, organic oils, organic solvents and mixtures of these.

In various embodiments, the vehicle (VIII), if present in the release coating composition, is an organic liquid. Organic liquids include those considered oils or solvents. The organic liquids are exemplified by, but not limited to, aromatic hydrocarbons, aliphatic hydrocarbons, alcohols having more than 3 carbon atoms, aldehydes, ketones, amines, esters, ethers, glycols, glycol ethers, alkyl halides and aromatic halides. Hydrocarbons include isododecane, isohexadecane, Isopar L (C11-C13), Isopar H (C11-C12), hydrogenated polydecene, aromatic hydrocarbons, and halogenated hydrocarbons. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, and octyl palmitate. Additional organic fluids suitable as a stand-alone compound or as an ingredient to the vehicle (VIII) include fats, oils, fatty acids, and fatty alcohols.

The vehicle (VIII) may also be, or comprise, a low viscosity organopolysiloxane or a volatile methyl siloxane or a volatile ethyl siloxane or a volatile methyl ethyl siloxane having a viscosity at 25° C. in the range of 1 to 1,000 mm$^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy))trisiloxane, hexamethyl-3,3, bis{(trimethylsilyl)oxy}trisiloxane pentamethyl((trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

In specific embodiments, the vehicle (VIII) is selected from polyalkylsiloxanes; tetrahydrofuran; mineral spirits; naphtha; an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether; or a combination thereof. In one embodiment, when the composition is in the form of an emulsion, the vehicle (VIII) can comprise, alternatively consist of, an aqueous medium, or water.

The amount of the vehicle (VIII) will depend on various factors including the type of vehicle selected and the amount and type of other components present in the release coating composition. However, the amount of the vehicle (VIII) in the release coating composition may be from 0% to 99%, alternatively 2% to 50%, based on the total weight of the composition. The vehicle (VIII) may be added during preparation of the composition, for example, to aid mixing and delivery. All or a portion of the vehicle (VIII) may optionally be removed after the release coating composition is prepared, including prior to and/or contemporaneous with preparing the release coating from the release coating composition. It is to be appreciated that the vehicle (VIII) may be the same as or different from the solvent utilized to prepare the branched cyclic polyorganohydrogensiloxane compound of the additive composition (I).

In certain embodiments, the release coating composition further comprises the cross-linker (VIX). The cross-linker (VIX) is distinguished from the diluent (D) in component (I), if present, which may also serve as a cross-linker when the composition is utilized to prepare a release coating. The (VIX) cross-linker may be a supplemental cross-linker in the release coating composition beyond the diluent (D) in component (I), if present.

In general, the cross-linker (VIX) comprises an organosilicon compound having an average of at least two silicon-bonded hydrogen atoms per molecule. The organosilicon compound typically reacts with the ethylenically unsaturated groups of component (II) when forming a coating, e.g. a release coating, and may comprise any combination of M, D, T and/or Q siloxy units, so long as the organosilicon compound includes at least two silicon-bonded hydrogen atoms per molecule. These siloxy units can be combined in various manners to form cyclic, linear, branched and/or resinous (three-dimensional networked) structures. The organosilicon compound may be monomeric, polymeric, oligomeric, linear, branched, cyclic, and/or resinous depending on the selection of M, D, T, and/or Q units. As such, the organosilicon compound may be linear, branched, partly branched, cyclic, resinous (i.e., have a three-dimensional network), or may comprise a combination of different structures.

Because the organosilicon compound of the cross-linker (VIX) includes an average of at least two silicon-bonded hydrogen atoms per molecule, with reference to the siloxy units set forth above, the organosilicon compound may comprise any of the following siloxy units including silicon-bonded hydrogen atoms, optionally in combination with siloxy units which do not include any silicon-bonded hydrogen atoms: $(R^1_2HSiO_{1/2})$, $(R^1H_2SiO_{1/2})$, $(H_3SiO_{1/2})$, $(R^1HSiO_{2/2})$, $(H_2SiO_{2/2})$, and/or $(HSiO_{3/2})$, where each $R^1$ is independently selected and defined above. Typically, the organosilicon compound of the cross-linker (VIX) comprises an organohydrogensiloxane.

In specific embodiments, the organosilicon compound of the cross-linker (VIX) is a substantially linear, alternatively linear, polyorganohydrogensiloxane. The substantially linear or linear polyorganohydrogensiloxane has unit formula: $(HR^{10}_2SiO_{1/2})_{v'}(HR^{10}SiO_{2/2})_{w'}(R^{10}_2SiO_{2/2})_{x'}(R^{10}_3SiO_{1/2})_{y'}$, where each $R^{10}$ is an independently selected monovalent hydrocarbon group, subscript v' is 0, 1, or 2, subscript w' is 1 or more, subscript x' is 0 or more, subscript y' is 0, 1, or 2, with the provisos that a quantity (v'+y')=2, and a quantity (v'+w')≥3. The monovalent hydrocarbon group for $R^{10}$ may be as described above for the monovalent hydrocarbon group for $R^1$. A quantity (v'+w'+x'+y') may be 2 to 1,000. The polyorganohydrogensiloxane is exemplified by:

i) dimethylhydrogensiloxy-terminated poly(dimethyl/methylhydrogen)siloxane copolymer, ii) dimethylhydrogensiloxy-terminated polymethylhydrogensiloxane, iii) trimethylsiloxy-terminated poly(dimethyl/methylhydrogen)siloxane copolymer, iv) trimethylsiloxy-terminated polymethylhydrogensiloxane, and/or v) a combination of two or more of i), ii), iii), iv), and v).

Suitable polyorganohydrogensiloxanes are commercially available from Dow Silicones Corporation of Midland, Mich., USA.

In some embodiments, the organosilicon compound of the cross-linker (VIX) is linear and includes pendent silicon-bonded hydrogen atoms. In these embodiments, the organosilicon compound may be a dimethyl, methyl-hydrogen polysiloxane having the average formula:

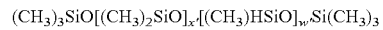

where x' and w' are defined above. One of skill in the art understands that in the exemplary formula above the dimethylsiloxy units and methylhydrogensiloxy units may be present in randomized or block form, and that any methyl group may be replaced with any other hydrocarbon group free of aliphatic unsaturation.

In certain embodiments, the organosilicon compound of the cross-linker (VIX) is linear and includes terminal silicon-bonded hydrogen atoms. In these embodiments, the organosilicon compound may be an SiH terminal dimethyl polysiloxane having the average formula:

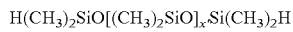

H(CH$_3$)$_2$SiO[(CH$_3$)$_2$SiO]$_{x'}$Si(CH$_3$)$_2$H where x' is as defined above. The SiH terminal dimethyl polysiloxane may be utilized alone or in combination with the dimethyl, methyl-hydrogen polysiloxane disclosed immediately above. When a mixture is utilized, the relative amount of each organohydrogensiloxane in the mixture may vary. One of skill in the art understands that any methyl group in the exemplary formula above may be replaced with any other hydrocarbon group free of aliphatic unsaturation.

In particular embodiments, the organosilicon compound of the cross-linker (VIX) may include both pendent and terminal silicon-bonded hydrogen atoms.

In some embodiments, the organosilicon compound of the cross-linker (VIX) may comprise an alkylhydrogen cyclosiloxane or an alkylhydrogen dialkyl cyclosiloxane copolymer. Specific examples of suitable organohydrogensiloxanes of this type include (OSiMeH)$_4$, (OSiMeH)$_3$(OSiMeC$_6$H$_{13}$), (OSiMeH)$_2$(OSiMeC$_6$H$_{13}$)$_2$, and (OSiMeH)(OSiMeC$_6$H$_{13}$)$_3$, where Me represents methyl (—CH$_3$).

Other examples of suitable organohydrogensiloxanes for use in or as the cross-linker (VIX) (e.g. in or as the organosilicon compound thereof) are those having at least two SiH containing cyclosiloxane rings in one molecule. Such an organohydrogensiloxane may be any organopolysiloxane having at least two cyclosiloxane rings with at least one silicon-bonded hydrogen (SiH) atom on each siloxane ring. Cyclosiloxane rings contain at least three siloxy units (that is, the minimum needed in order to form a siloxane ring), and may be any combination of M, D, T, and/or Q siloxy units that forms a cyclic structure, provided that at least one of the cyclic siloxy units on each siloxane ring contains one SiH unit, which may be an M siloxy unit, a D siloxy unit, and/or a T siloxy unit. These siloxy units can be represented as MH, DH, and TH siloxy units respectively when other substituents are methyl.

The cross-linker (VIX) may comprise a combination or two or more different organohydrogensiloxanes that differ in at least one property such as structure, molecular weight, monovalent groups bonded to silicon atoms and content of silicon-bonded hydrogen atoms. The release coating composition may comprise the organosilicon compound(s) in an amount to give a molar ratio of silicon-bonded hydrogen atoms in component (VIX) to silicon-bonded ethylenically unsaturated groups in component (II) in an amount of from 1:1 to 5:1, alternatively from 1.1:1 to 3.1. In certain embodiments, the release coating composition may comprise the cross-linker (VIX) and component (I) in amounts sufficient to give a combined molar ratio of silicon-bonded hydrogen atoms in components (I) and (VIX) to silicon-bonded ethylenically unsaturated groups in component (II) of from 1:1 to 5:1, alternatively from 1.1:1 to 3.1.

Other optional components may be present in the composition, including, for example, reactive diluents, fragrances, preservatives, colorants, dyes, pigments, anti-oxidants, heat stabilizers, flame retardants, flow control additives, biocides, fillers (including extending and reinforcing fillers), surfactants, thixotroping agents, pH buffers, etc. The composition may be in any form and may be incorporated into further compositions. For example, the composition may be in the form of, or incorporated into, an emulsion. The emulsion may be an oil-in-water emulsion, water-in-oil emulsion, silicone-in-oil emulsion, etc. The composition itself may be a continuous or discontinuous phase of such an emulsion.

In certain embodiments, the release coating composition and release coating formed therefrom may be free of particulates or contain only a limited amount of particulates (e.g., filler and/or pigment), such as 0 to 30% by weight of the composition. Particulates can agglomerate or otherwise stick to the coater equipment used to form the release coating. In addition, particulates can hinder optical properties, for example transparency, of the release coating and of the release liner formed therewith, if optical transparency is desired. The particulates may be prejudicial to the adherence of an adherent.

In certain embodiments, the release coating composition is free from fluoroorganosilicone compounds. It is believed that, during the cure, a fluorocompound, because of its low surface tension, may rapidly migrate to the interface of the composition or the release coating formed therewith and a substrate on which the composition is applied and the release coating is formed, for example a composition/PET film interface. Such migration may prevent adherence of the release coating (prepared by curing the composition) to the substrate by making a fluorine containing barrier. By making a barrier, the fluoroorganosilicone compounds may prevent any component of the composition from reacting at the interface, impacting curing and related properties. Moreover, fluoroorganosilicone compounds are usually expensive.

The release coating composition may be prepared by combining components (I)-(III), as well as any optional components (e.g. components (IV)-(VIX) described above), in any order of addition, optionally with a master batch, and optionally under shear. As described in greater detail below, the release coating composition may be a one part composition, a two component or composition, or a multi-part composition. For example, components (I) and (II) may be a single part of the release coating composition. When the composition is utilized to prepare the release coating or coated substrate, as described below, components (I) and (II) are combined with components (III) and (IV), as well as any optional components, such that the release coating composition is the curable composition.

When formulated for preparing a release coating or liner, the release coating composition may be prepared by mixing the components together, for example, to prepare a one part composition. However, it may be desirable to prepare a release coating composition as a multiple part composition, in which components having SiH functionality (e.g., the branched cyclic polyorganohydrogensiloxane, the diluent (D), etc.) and the catalyst (III) are stored in separate parts, until the parts are combined at the time of use (e.g., shortly before application to a substrate). The release coating composition can be utilized to form the coated substrate as described above, and the release coating is formed by applying and curing the release coating composition on the substrate, e.g. a surface of the substrate.

For example, a multiple part curable composition may comprise: a Part (A) including the additive composition (I) and the organopolysiloxane (II), and optionally when present, one or more of the anchorage additive (V), the vehicle (VIII), and the cross-linker (VIX), and a Part (B) including the catalyst (III), and optionally when present, one or more of the anchorage additive (V) and/or the vehicle (VIII). When utilized, the inhibitor (IV) may be added to either Part (A), Part (B), or both. Part (A) and Part (B) may be combined in a weight ratio (A):(B) of 1:1 to 30:1, alternatively 1:1 to 10:1, alternatively 1:1 to 5:1, and alternatively 1:1 to 2:1. Part (A) and Part (B) may be provided in a kit with instructions, e.g., for how to combine the parts to prepare the release coating composition, how to apply the release coating composition to a substrate, and how to cure the release coating composition. When utilized, the anchorage additive (V) can be incorporated in either of Part (A) or Part (B), or it can be added in a separate (third) part.

As introduced above, in various embodiments, the release coating composition may be prepared as an emulsion, e.g. an oil-in-water or water-in-oil emulsion depending on the selection of the continuous and discontinuous phase thereof. In these embodiments, the vehicle (VIII) is present in the composition as an aqueous medium, or water. The oil phase of the emulsion comprises the silicone components of the composition. In certain embodiments, the oil phase may further comprise an organic oil or a silicone oil to carry at least the silicone components of the composition. However, the organic oil or silicone oil is not required to prepare the emulsion. In addition, the emulsion can be a multi-part emulsion comprising different emulsions having different components, which multi-parts of the emulsion are combined and mixed in connection with curing. The emulsion can comprise any of the optional components described above in any part.

The organic oil is typically a non-reactive or inert, i.e., the organic oil does not participate in any reaction in connection with curing the reactive components of the composition. Typically, the silicone components (e.g. components (I), (II), and (VIX), when present) are dispersed in the oil phase rather than the aqueous phase of the emulsion, such that, in certain embodiments, the emulsion formed may be characterized as a silicone-water or silicone oil-water emulsion (e.g. silicone-in-water, water-in-silicone oil, etc.).

In certain embodiments, suitable organic oils, if utilized, include those which dissolve at least components (I) and (II), which typically forms a clear solution, and those which can be combined with at least components (I) and (II) to form a homogeneous dispersion without phase separation prior to, during, and/or after the formation of the release coating composition. The organic oil may be, for example, any one or combination of the following: hydrocarbon oils, such as mineral oil fractions comprising linear (e.g., n-paraffinic) mineral oils, branched (iso-paraffinic) mineral oils, and/or cyclic (sometimes referred to as naphthenic) mineral oils, the hydrocarbons in the oil fractions comprising from 5 to 25 carbon atoms per molecule, or a liquid linear or branched paraffin containing 12 to 40 carbon atoms; polyisobutylenes (PIB); phosphate esters, such as trioctyl phosphate; polyalkylbenzenes; linear and/or branched alkylbenzenes, such as heavy alkylates, dodecyl benzene and other alkylarenes; esters of aliphatic monocarboxylic acids; linear or branched mono unsaturated hydrocarbons, such as linear or branched alkenes or mixtures thereof containing from 8 to 25 carbon atoms; and natural oils and derivatives thereof.

In one embodiment, the organic oil may include mineral oil fractions, natural oils, alkylcycioaliphatic compounds, alkybenzenes including polyalkylbenzenes, or combinations thereof.

Alkylbenzene compounds suitable for use as the organic oil include, for example, heavy alkylate alkylbenzenes and alkylcycloaliphatic compounds. Heavy alkylate alkylbenzenes include, for example, alkyl substituted aryl compounds which have aryl groups, such as benzene substituted by alkyl and/or other substituents. Additional examples include the extenders described in U.S. Pat. No. 4,312,801, which is incorporated by reference in its entirety.

Any suitable mixture of mineral oil fractions or mineral oil fractions in combination with any other organic oils may be used as the organic oil. Additional examples of organic oils include alkylcyclohexanes and paraffinic hydrocarbons (which may be linear, branched, or cyclic). The cyclic paraffinic hydrocarbons may be monocyclic and/or polycyclic hydrocarbons (naphthenics).

In another embodiment, the organic oil may comprise a natural oil. Natural oils are oils that are not derived from petroleum. More specifically, natural oils are derived from animals and/or vegetative matter (including seeds and nuts). Common natural oils include triglycerides of mixtures of fatty acids, particularly mixtures containing some unsaturated fatty acid. Alternatively, the organic oil may be a derivative of a natural oil such as a transesterified vegetable oil, a boiled natural oil, a blown natural oil, or a stand oil (e.g. a thermally polymerized oil). The natural oil may be derived from a variety of sources and may comprise, for example, wheatgerm, sunflower, grapeseed, castor, shea, avocado, olive, soybean, sweet almond, palm, rapeseed, cotton seed, hazelnut, macadamia, jojoba, blackcurrant, evening primrose, and combinations thereof.

Alternatively to the liquids exemplified above, the organic oil may be a solid, such as a wax. When the organic oil comprises a wax, the wax typically has a melting point of from 30 to 100° C. The wax may be, for example, a hydrocarbon wax, such as a petroleum-derived wax; a wax comprising carboxylic esters, such as beeswax, lanolin, tallow, carnauba, candelilla, tribehenin; or a wax derived from plant seeds, fruits, nuts or kernel, including softer waxes referred to as 'butter,' such as mango butter, shea butter or cocoa butter. The wax may alternatively be a polyether wax or a silicone wax.

The mixture formed by combining component (I) and (II), and optionally components (III) and/or (VIX) and the organic oil (i.e., the "oil phase mixture"), may be heterogeneous or homogenous. When the organic oil is utilized and comprises a mineral oil, the organic oil and at least components (I) and (II) are typically miscible, i.e., form a homogenous oil phase mixture. In contrast, when the organic oil comprises a natural oil, the organic oil and at least components (I) and (II) are commonly immiscible, i.e., form a heterogeneous oil phase mixture. As the organic oil may solubilize, alternatively partially solubilize, at least components (I) and (II), optionally also components (III) and/or (VIX) if present, the organic oil may be referred to as a carrier or a solvent (i.e., depending on whether components (I) and (II) solubilize or dissolve in the organic oil, e.g. when used in combination with or in place of the vehicle (VIII) described above). The oil phase mixture can be formed in any manner, including any order of addition, with optional mixing or stirring.

Typically, preparing the release coating composition as an emulsion comprises combining the oil phase mixture, an aqueous medium, and a surfactant to form the emulsion. The oil phase mixture is typically a discontinuous phase in the aqueous medium of the emulsion. The emulsion may be formed via the application of shear, e.g. by mixing, shaking, stirring, etc.

The discontinuous phase of the emulsion is generally present as particles in the aqueous medium. The particles are liquid and may have generally spherical or other shapes, and may have varying sizes based on the components selected and their relative amounts. Particle size may be determined via laser diffraction particle size analysis (i.e., laser light scattering), e.g. using a Mastersizer 3000 particle size analyzer available from Malvern Panalytical Ltd of Malvern, UK, to determine particle sizes and distribution curves of the emulsion particles. As will be understood by those of skill in the art, a reported volume median diameter (VMD or "Dv(0.5)") represents a midpoint diameter (in μm), i.e., where 50% of the particles have a diameter larger, and 50/a of the particles have a diameter smaller, than the median value. Similarly, a reported Dv(0.9) represents the diameter below which falls 90% of the volume distribution of particles, and a reported Dv(0.1) represents the diameter below which falls 10% of the volume distribution of particles. In some embodiments, the release coating composition is prepared as the emulsion comprising a Dv(0.5) less than 1.5 μm, such as from 0.3 to 1.0 μm, alternatively from 0.4 to 0.9 μm. In these or other embodiments, the emulsion comprises a Dv(0.9) less than 3.0 μm, such as from 0.5 to 2.5 μm, alternatively from 1.2 to 2.0 μm. In these or other embodiments, the emulsion comprises a Dv(0.1) less than 0.9 μm, such as from 0.1 to 0.7 μm, alternatively from 0.2 to 0.5 μm. Particle sizes and distributions outside the preceding ranges may also be utilized, and will typically be selected by one of skill in the art, e.g. in view of the desired property of the release coating composition (e.g. such as viscosity, transparency, translucency, etc.).

The aqueous medium comprises water. The water may be from any source and may optionally be purified, e.g. via distillation, reverse osmosis, etc. The aqueous medium may further comprise one or more additional components other than water, as described below.

The surfactant may be any surfactant capable of emulsifying the various components or improving stability of the emulsion. For example, the surfactant may comprise one or more anionic, cationic, nonionic, and/or amphoteric surfactants, organomodified silicones such as dimethicone copolyol, oxyethylenated and/or oxypropylenated ethers of glycerol, oxyethylenated and/or oxypropylenated ethers of fatty alcohols such as ceteareth-30, C12-15 pareth-7, fatty acid esters of polyethylene glycol such as PEG-50 stearate, PEG-40 monostearate, saccharide esters and ethers such as sucrose stearate, sucrose cocoate and sorbitan stearate, and mixtures thereof, phosphoric esters and salts thereof such as DEA oleth-10 phosphate, sulphosuccinates such as disodium PEG-5 citrate lauryl sulphosuccinate and disodium ricinoleamido MEA sulphosuccinate, alkyl ether sulphates such as sodium lauryl ether sulphate, isethionates, betaine derivatives, and mixtures thereof.

In certain embodiments, the surfactant comprises the anionic surfactant. Anionic surfactants include, for example, carboxylates (sodium 2-(2-hydroxyalkyloxy)acetate)), amino acid derivatives (N-acylglutamates, N-acylglycinates or acylsarcosinates), alkyl sulfates, alkyl ether sulfates and oxyethylenated derivatives thereof, sulfonates, isethionates and N-acylisethionates, taurates and N-acyl N-methyltaurates, sulfosuccinates, alkylsulfoacetates, phosphates and alkyl phosphates, polypeptides, anionic derivatives of alkyl polyglycoside (acyl-D-galactoside uronate), and fatty acid soaps, alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated aromatic hydrocarbons such as sodium alpha-naphthalene monosulfonate, condensation products of naphthalene sulfonic acids with formaldehyde, sodium octahydroanthracene sulfonate, alkali metal alkyl sulfates such as sodium lauryl sulfate, ammonium lauryl sulfate and triethanol amine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, alkylarylsulfonates having 1 or more alkyl groups of 8 or more carbon atoms, alkylbenzenesulfonic acid alkali metal salts exemplified by hexylbenzenesulfonic acid sodium salt, octylbenzenesulfonic acid sodium salt, decylbenzenesulfonic acid sodium salt, dodecylbenzenesulfonic acid sodium salt, cetylbenzenesulfonic acid sodium salt, and myristylbenzenesulfonic acid sodium salt, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid, and mixtures thereof.

In these or other embodiments, the surfactant comprises the cationic surfactant. Cationic surfactants include, for example, various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such asundecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, and hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmitylhydroxyethylammonium methosulfate, amide derivatives of amino alcohols such as beta-hydroxyethylstearylamide, amine salts of long chain fatty acids, and mixtures thereof.

In these or other embodiments, the surfactant comprises the nonionic surfactant. Nonionic surfactants include, for example, polyoxyethylene alkyl ethers (such as lauryl, isotridecyl, branched decyl, cetyl, stearyl or octyl), polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, polyoxyalkylene-substituted silicones (rake or ABn types), silicone alkanolamides, silicone esters, silicone glycosides, dimethicone copolyols, fatty acid esters of polyols, for instance sorbitol and glyceryl mono-, di-, tri- and sesqui-oleates and stearates, glyceryl and polyethylene glycol laurates; fatty acid esters of polyethylene glycol (such as polyethylene glycol monostearates and monolaurates), polyoxyethylenated fatty acid esters (such as stearates and oleates) of sorbitol, and mixtures thereof.

In these or other embodiments, the surfactant comprises the amphoteric surfactant. Amphoteric surfactants, include, for example, amino acid surfactants, betaine acid surfactants, trimethylnonyl polyethylene glycol ethers and polyethylene glycol ether alcohols containing linear alkyl groups having from 11 to 15 carbon atoms, such as 2,6,8-trimethyl-4-nonyloxypolyethylene oxyethanol (6 EO) (sold as Tergitol®TMN-6 by OSi Specialties, A Witco Company, Endicott, N.Y.), 2,6,8-trimethyl-4-nonyloxypolyethylene oxyethanol (10 EO) (sold as Tergitol®TMN-10 by OSi Specialties, A Witco Company, Endicott, N.Y.), alkylene-oxypolyethylene oxyethanol ($C_{11-15}$ secondary alkyl, 9 EO) (sold as Tergitol®15-S-9 by OSi Specialties, A Witco Company, Endicott, N.Y.), alkylene-oxypolyethylene oxyethanol ($C_{11-15}$ secondary alkyl, 15 EO) (sold as Tergitol®15-S-15 by OSi Specialties, A Witco Company, Endicott, N.Y.), octylphenoxy polyethoxy ethanols having varying amounts of ethylene oxide units such as octylphenoxy polyethoxy ethanol (40 EO) (sold as Triton® X405 by Rohm and Haas Company, Philadelphia, Pa.), nonionic ethoxylated tridecyl ethers available from Emery Industries, Mauldin, S.C. under the general tradename Trycol, alkali metal salts of dialkyl sulfosuccinates available from American Cyanamid Company, Wayne, N.J. under the general tradename Aerosol, polyethoxylated quaternary ammonium salts and ethylene oxide condensation products of the primary fatty amines (available from Armak Company, Chicago, Ill. under the tradenames Ethoquad, Ethomeen, or Arquad), polyoxyalkylene glycol modified polysiloxanes, N-alkylamidobetaines and derivatives thereof, proteins and derivatives thereof, glycine derivatives, sultaines, alkyl polyaminocarboxylates and alkylamphoacetates, and mixtures thereof. These surfactants may also be obtained from other suppliers under different tradenames.

One of skill in the art can readily optimize relative amounts of components in the emulsion and methods of its preparation. For example, when the release coating composition (e.g. as the curable composition) is in the form of the emulsion, the emulsion can be a two part emulsion to separate the reactive components and/or catalyst therefrom. In some embodiments, the emulsion is prepared comprising a specific non-volatile content (NVC). NVC may be determined by evaluating a sample of the emulsion via microwave-mediated drying with continuous mass balance, e.g. using a Smart System5 Moisture and Solids Analyzer available from CEM Corporation of Matthews, N.C., USA (i.e., a microprocessor-controlled system including integrated microwave drying chamber, electronic balance, and infrared temperature controller). As will be understood by those of skill in the art, NVC is calculated and reported (in wt. %) based on the weight of solids remaining after sample drying. In some embodiments, the release coating composition is prepared as the emulsion comprising a NVC of from 25 to 60 wt. %, such as from 30 to 50, alternatively from 35 to 45, alternatively from 39 to 43 wt. %.

A method of preparing a coated substrate with the curable composition comprises applying, i.e., disposing, the composition on the substrate. The method further comprises curing the curable composition on the substrate, which results in the formation of the release coating on the substrate to give the coated substrate. Curing may be performed by heating at an elevated temperature, e.g. 50 to 180° C., alternatively 50 to 120° C., alternatively 50 to 90° C., to give the coated substrate. One skilled in the art would be able to select an appropriate temperature depending on various factors including the selection of the components in the curable composition and the substrate composition or material of construction.

The curable composition may be disposed or dispensed on the substrate in any suitable manner. Typically, the curable composition is applied in wet form via a wet coating technique. The curable composition may be applied by i) spin coating; ii) brush coating; iii) drop coating; iv) spray coating; v) dip coating: vi) roll coating; vii) flow coating; viii) slot coating; ix) gravure coating; x) Meyer bar coating; or xi) a combination of any two or more of i) to x). Typically, disposing the curable composition on the substrate results in a wet deposit on the substrate, which is subsequently cured to give the coated substrate, which comprises a cured film, i.e., the release coating, formed from the curable composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the wet deposit. The substrate may optionally have a continuous or non-continuous shape, size, dimension, surface roughness, and other characteristics. Alternatively, the substrate may have a softening point temperature at the elevated temperature. However, the curable composition and method are not so limited.

Alternatively, the substrate may comprise a plastic, which may be a thermosetting and/or thermoplastic. However, the substrate may alternatively be or comprise glass, metal, cellulose (e.g. paper), wood, cardboard, paperboard, a silicone, or polymeric materials, or a combination thereof.

Specific examples of suitable substrates include paper substrates such as Kraft paper, polyethylene coated Kraft paper (PEK coated paper), thermal paper, and regular papers; polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethemitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The curable composition, or wet deposit, is typically cured at the elevated temperature for a period of time. The period of time is typically sufficient to effect curing, i.e., cross-linking, of the curable composition. The period of time may be from greater than 0 to 8 hours, alternatively from greater than 0 to 2 hours, alternatively from greater than 0 to 1 hour, alternatively from greater than 0 to 30 minutes, alternatively from greater than 0 to 15 minutes, alternatively from greater than 0 to 10 minutes, alternatively from greater than 0 to 5 minutes, alternatively from greater than 0 to 2 minutes. The period of time depends on various factors including on the elevated temperature is utilized, the temperature selected, desired film thickness, and the presence of absence of any water or vehicle in the curable composition.

Curing the curable composition typically has a dwell time of from 0.1 second to 50 seconds; alternatively from 1 second to 10 seconds; and alternatively from 0.5 second to 30 seconds. Dwell time selected may depend on the substrate selection, temperature selected, and line speed. Dwell time, as used herein, refers to the time during which the curable composition, or wet deposit, is subjected to the elevated temperature. Dwell time is distinguished from cure time, as there may be ongoing curing even after the curable composition, wet deposit, or partially cured reaction intermediary thereof is no longer subjected to the elevated temperature, which typically initiates curing. Alternatively, the coated article may be prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on the optional presence and selection of the vehicle (VIII), curing the composition may also include the step of drying. For example, when the composition is in the form of an emulsion such that the vehicle (VIII) is present and comprises water, the step of curing typically also removes drying or removing water from the emulsion. Drying may be contemporaneous with curing or may be separate from curing.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite is of partially cured layers may be subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of components selected in the curable composition, their amounts, or both. Alternatively still, each iterative layer may be fully cured, rather than only being partially cured, in such an iterative process.

Alternatively, the deposit may comprise a wet film. Alternatively, the iterative process may be wet-on-wet, depending on a cure state of the partially cured layer. Alternatively, the iterative process may be wet-on-dry.

The coated substrate, which comprises the film formed from the curable composition on the substrate, may have varying dimensions, including relative thicknesses of the film and the substrate. The film has a thickness that may vary depending upon its end use application. The film may have a thickness of greater than 0 to 4,000 µm, alternatively greater than 0 to 3,000 µm, alternatively greater than 0 to 2,000 µm, alternatively greater than 0 to 1,000 µm, alternatively greater than 0 to 500 µm, alternatively greater than 0 to 250 µm. However, other thicknesses are contemplated, e.g. 0.1 to 200 µm. For example, the thickness of the film may be 0.2 to 175 µm; alternatively 0.5 to 150 µm; alternatively 0.75 to 100 µm; alternatively 1 to 75 µm; alternatively 2 to 60 µm; alternatively 3 to 50 µm; and alternatively 4 to 40 µm. Alternatively, when the substrate is plastic, the film may have a thickness of greater than 0 to 200, alternatively greater than 0 to 150 µm, and alternatively greater than 0 to 100 µm.

If desired, the film may be subjected to further processing depending upon its end use application. For example, the film may be subjected to oxide deposition (e.g. $SiO_2$ deposition), resist deposition and patterning, etching, chemical, corona, or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The coated substrate may be utilized in diverse end use applications. For example, the coated substrate may be utilized in coating applications, packaging applications, adhesive applications, fiber applications, fabric or textile applications, construction applications, transportation applications, electronics applications, or electrical applications. However, the curable composition may be utilized in end use applications other than preparing the coated substrate, e.g. in the preparation of articles, such as silicone rubbers.

Alternatively, the coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may having a film disposed thereon for double sided tapes or adhesives.

The release coating composition can for example be applied to the substrate by any convenient means such as spraying, doctor blade, dipping, screen printing or by a roll coater, e.g. an offset web coater, kiss coater or etched cylinder coater.

The release coating composition of the invention can be applied to any substrate, such as those described above. Alternatively, the release coating composition may be applied to polymer film substrates, for example polyester, particularly polyethylene terephthalate (PET), polyethylene, polypropylene, or polystyrene films. The release coating composition can alternatively be applied to a paper substrate, including plastic coated paper, for example paper coated with polyethylene, glassine, super calendar paper, or clay coated kraft. The release coating composition can alternatively be applied to a metal foil substrate, for example aluminum foil.

In certain embodiments, the method of preparing the coated substrate may further comprise treating the substrate before applying or disposing the release coating composition on the substrate. Treating the substrate may be performed by any convenient means such as a plasma treatment or a corona discharge treatment. Alternatively, the substrate may be treated by applying a primer. In certain instances, anchorage of the release coating may be improved if the substrate is treated before forming the release coating thereon from the release coating composition.

When the release coating composition includes the vehicle (VIII), the method may further comprise removing the vehicle (VIII), which may be performed by any conventional means, such as heating at 50 to 100° C. for a time sufficient to remove all or a portion of the vehicle (VIII). The method may further comprise curing the release coating composition to form the release coating on a surface of the substrate. Curing may be performed by any conventional means such as heating at 100 to 200° C.

Under production coater conditions, cure can be effected in a residence time of 1 second to 6 seconds, alternatively 1.5 seconds to 3 seconds, at an air temperature of 120° C. to 150° C. Heating can be performed in an oven, e.g., an air circulation oven or tunnel furnace or by passing the coated film around heated cylinders.

The following examples are intended to illustrate the invention and are not to be viewed in any way as limiting to the scope of the invention. Certain components utilized in the Examples are set forth in Table 1 below, followed by characterization and evaluation procedures also used in the Examples.

TABLE 1

| Component | Description |
|---|---|
| Polydiorganosiloxane (A) | Hydroxyl-terminated polydimethylsiloxane of formula $M^{OH}D_nM^{OH}$, n = 8-10 (silanol fluid) |
| Cyclic Hydrogensiloxane (B) | Hydrido-methyl-cyclosiloxane of formula $(CH_3HSiO_{2/2})_v$, v = 4-6 |
| Catalyst (C) | Tris(pentafluorophenyl)borane |
| Diluent (D1) | Trimethylsiloxy-terminated hydrido-methyl siloxane having formula $MD^H{}_{25}M$ |
| Diluent (D2) | Trimethylsiloxy-terminated hydrido-methyl dimethyl siloxane having formula $MD_{6.42}D^H{}_{16.73}M$ |
| Solvent (E1) | Heptane, anhydrous |
| Solvent (E2) | Toluene ($C_7H_8$) |
| Organopolysiloxane (II-1) | Vinyl end-blocked Q-branched polymer having formula $M^{Vi}{}_4D_{227}Q$ |
| Organopolysiloxane (II-2) | Vinyl end-blocked Q-branched polymer having formula $Q\text{-}D_{160}M^{Vi}{}_4$ |
| Hydrosilylation Catalyst (III) | Karstedt's catalyst |
| Additive (I-C1) | Vinyl functionalized multi Q-branched polymer having formula $M^{Vi}{}_{1.69n}M^{OZ}{}_{0.32n}D_{358.61n}Q_{1.00n}$ (n > 1) |
| Additive (I-C2) | Dumbbell-shaped crosslinker of formula: 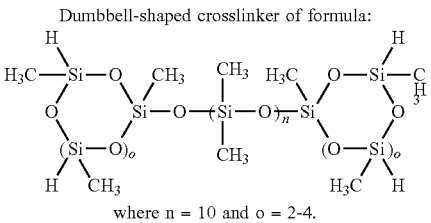 where n = 10 and o = 2-4. |
| Additive (I-C3) | Dumbbell-shaped crosslinker of formula: 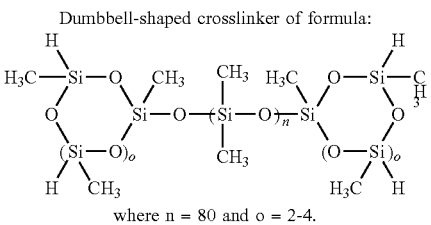 where n = 80 and o = 2-4. |

TABLE 1-continued

Components

| Component | Description |
|---|---|
| Crosslinker (VIX-1) | Trimethylsiloxy-terminated poly(dimethyl/methylhydrogen)siloxane copolymer of formula $MD_{18}D^H{}_{42}M$ |
| Crosslinker (VIX-2) | Epoxy-functionalized dumbbell-shaped crosslinker of formula: 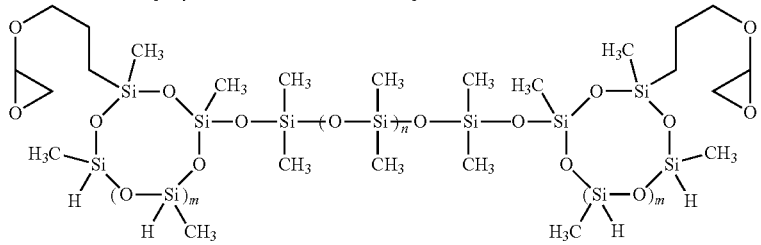 where n = 10 and m = 1-3 |
| Crosslinker (VIX-3) | Blend of (VIX-1) trimethylsiloxy-terminated poly(dimethyl/methylhydrogen)siloxane copolymer of formula $MD_{18}D^H{}_{42}M$ and trimethylsiloxy-terminated hydrido-methyl siloxane of formula $MD^H{}_{40}M$ |
| Inhibitor (IV-1) | Diallyl maleate |
| Inhibitor (IV-2) | Ethynyl cyclohexanol |
| Inhibitor (IV-3) | 3,5-dimethyl-1-hexyn-3-ol |

Nuclear Magnetic Resonance Spectroscopy (NMR)

Nuclear magnetic resonance (NMR) spectra are obtained on a NMR BRUKER AVIII (400 MHz), using a silicon-free 10 mm tube and $CDCl_3/Cr(AcAc)_3$ solvent. Chemical shifts for $^{29}Si$-NMR spectra are referenced to internal solvent resonance and are reported relative to tetramethylsilane.

Gel Permeation Chromatography (GPC)

Gel permeation chromatography (GPC) analysis is conducted on an Agilent 1260 Infinity II chromatograph equipped with a triple detector composed of a differential refractometer, an online differential viscometer, a low angle light scattering (LALS: 15° and 90° angles of detection), and a column (2 PL Gel Mixed C, Varian). Toluene (HPLC grade, Biosolve) is used as mobile phase, at a flow rate of 1 mL/min.

Dynamic Viscosity (DV)

Dynamic viscosity (DV) is measured with a Brookfield DV2-T viscometer equipped with a SC4-27D, using a sample volume of 10.4 mL, at a temperature of 25° C.

X-Ray Fluorescence (XRF)

X-Ray Fluorescence (XRF) is conducted on a Rigaku NEX QC+QC1499 or QC1747 XRF analyzer.

Mist Level Evaluation (MLE)

Mist level evaluation (MLE) is conducted using a mist evaluation system including a custom-built 2-roll coater disposed in an enclosed chamber equipped with a ventilation system. The coater includes a top roll (chrome) arranged in a stacked configuration over a rubber bottom roll (neoprene), which is arranged over a sample pan and driven by a motor (rotation of 1000 meters per minute (m/min), during operation). Each roll is 6 inches in diameter and 12 inches wide. The ventilation system is configured to draw air to a back wall of the enclosure, and includes a magnehelic gauge positioned at the ceiling of the enclosure to measure/monitor air flow (rate of 0.20-0.25 inches of water (i.e., 0.05-0.062 kPa), at the magnehelic gauge), two mist collection pipes positioned above the center of the top roll (6 inches) of the coater to collect mist, and an aerosol monitor (DustTrak 8530, recording mist level every 5 seconds) connected to each mist collection pipe.

A sample (600 g) is disposed into the sample pan, which is inserted below the bottom roll to be picked up and transferred to the top roll as a film. The coater is operated for 6 minutes, and mist generated therefrom is collected by the mist collection pipes and measured by the aerosol monitor. Mist levels obtained between 120 s to 360 s are averaged and reported as a mist value (in mg/m$^3$) for the sample.

Mist Level Industrial Evaluation (MLIE)

Mist level industrial evaluation (MLIE) is conducted on an industrial pilot line based on a 6-roll coating head having five rollers in a stacked configuration of alternating chrome steel and rubber-sleeved rolls. Specifically, two bottom rolls are aligned horizontally together to form a nip where a coating bath is held (i.e., the "first nip"), and the remaining rolls are aligned vertically to facilitate sample transfer from one roll to the next between the coating bath and a paper surface to be coated at a nip formed between the top two rolls (i.e., the "second nip"). Each roll is independently driven by a separate motor. A mist collection fixed pipe is located less than 20 cm from the second nip and connected to an aerosol monitor (DustTrak 8530).

A sample is disposed in the coating bath, and each roll is independently driven at a separate speed and pressed together using independent pressure settings to facilitate a stepwise reduction in coating thickness along the roller line from the coating bath to a paper surface. The top 2 rolls are driven at speeds close to a final desired speed (e.g. rotation of 1000 m/min) for a mist evaluation period, during which time mist levels are recorded and averaged and reported as a mist value (in mg/m$^3$) for the sample.

Cure Performance: Extractable Percentage

Cure performance of a sample composition is evaluated by determining an extractable percent value (extractable %). In particular, a sample composition is coated and cured on a substrate (Glassine paper) to form a coated substrate, which is immediately cut into three sample discs (die cutter, 1.375 inch (3.49 cm)) handled only by tweezers to minimize contamination and/or damage. Each sample disc is analyzed via XRF to determine an initial coat weight ($W^i_s$) before being placed in an individual bottle (100-mL, covered with a lid) containing solvent (methyl isobutyl ketone, 40 mL) and allowed to rest on a bench to soak for 30 minutes. Each sample disc is then removed from the bottle, placed coated-side-up on a clean surface (tissue paper) to allow residual solvent to evaporate (without blotting/wiping), and analyzed via XRF to determine a final coat weight ($W^f_s$). The extractable % of each sample is the percent change in coat weight from the solvent soak, i.e., is calculated using the formula: $[(W^i_s-W^f_s)/Wi]\times100\%)$. The extractable % indicates the amount of non-cured components of the sample composition (e.g. non-crosslinked silicone) extractable from the coated substrate, such as a lower extractable % indicates a higher/better cure performance Cure Performance: Anchorage (ROR %)

The anchorage of a sample composition is evaluated via anchorage index, i.e., by determining a percent rub-off resistance (ROR %) value. In particular, a sample composition is coated and cured on a substrate (Glassine paper) to form a coated substrate. Immediately following cure, the coated substrate is cut into two sample discs (die cutter, 1.375 inch (3.49 cm)), which are each analyzed via XRF to determine an initial coat weight ($W^i_a$). Each sample disc is then abraded with a felt (Ideal Felt white wool felt, 2"×17") under load (1.9 kg) using automated abrading equipment (Braive Instruments Washability Tester), in a method similar to a Taber-type abrasion test (e.g. such as that of ASTM D4060-19, "Standard Test Method for Abrasion Resistance of Organic Coatings by the Taber Abraser"), and subsequently analyzed via XRF to determine a final coat weight ($W^f_a$). The ROR % of each sample is calculated using the formula: $[W^f_s/W^i_s]\times100\%)$. The ROR % indicates how strong the coating is anchored to the substrate, such that a higher ROR % indicates a higher/better anchorage the higher the ROR % value the better.

Cure Performance: Aged Anchorage (Aged ROR %)

A substrate (release liner) is placed under load (40 lbs) and aged at RT under constant humidity (50% RH) for a selected time to give an aged substrate. The aged substrate is then utilized in the procedure above for anchorage assessment to determine a ROR % for a coating prepared with a sample composition on the aged substrate (i.e., an aged ROR %).

Cure Performance: Aged Rot Anchorage (JR ROR %)

A substrate (release liner) is placed under load (40 lbs) and aged at 65° C. and 85% relative humidity for selected time to give a Jungle Rot (JR) aged substrate. The JR aged substrate is then utilized in the procedure above for anchorage assessment to determine a ROR % for a coating prepared with a sample composition on the JR aged substrate (i.e., a JR ROR %).

Release Performance: Aged Rot Anchorage (JR ROR %)

A release liner is laminated with Tesa 7475 industrial standard test tape to give a laminate, which is placed under load (40 lbs) and aged at RT under constant humidity (50% RH) for a selected time to give an aged laminate. A release force test was conducted by employing the liner from the label method at four delamination speeds (0.3, 10, 100, and 300 m/min) at a peeling angle of 180° on Imass SP-2100 and ZPE-1100W release test systems.

Bulk Bath Life

Samples of release coating compositions (120 g) are prepared by combining together the starting materials described in the relevant examples at RT, and transferring the mixture into a 250 mL glass jar with cap. The capped glass jar is heated in a 40° C. water bath for 50-60 mins. Catalyst is then introduced into the mixture, which is then mixed further. The hours when the viscosity of the reaction mixture doubles at 40° C. is defined as the bulk bath life. The viscosity was measured by Brookfield DV-II viscometer with the #3 spindle.

Thin Film Bath Life

A 2 mil Bird Bar is used to coat a Sample of a release coating composition on a 1 MIL PET film. The resulting film is checked every 5 minutes. The time when the film becomes smudged or partially cured is defined as the thin film bath life of the release coating composition.

Examples 1-17: Additive Compositions Including Branched Cyclic Polyorganohydrogensiloxanes Various additive compositions are prepared. In particular, Cyclic Hydrogensiloxane (B) and Solvent (E-1) are added to a glass reactor with a glass stir shaft and Teflon stir blade, followed by Catalyst (C) dissolved in Solvent (E2). Polydiorganosiloxane (A) is then added via slow addition at room temperature, and the mixture was stirred for approximately 20 minutes. Diluent (D1 or D2) is then added, and the resulting mixture heated to 60° C. for 1 hour, followed by removal of the volatile components under vacuum (~1 torr; ~80° C.; 1-2 hours) to give Additive Compositions (I-1) to (I-17), which are analyzed via $^{29}$Si-NMR and DV. For Example 8, no diluent or concentration is utilized to prepare Additive Composition (I-8). The parameters of Examples 1-17 and properties of Additive Compositions I-1 to I-17 are shown in Tables 2-4 below.

TABLE 2

Components and Properties of Examples 1-6

| Component/Property | Ex. 1 | Ex. 2 | Ex. 3 | Ex. 4 | Ex. 5 | Ex. 6 |
|---|---|---|---|---|---|---|
| Polydiorganosiloxane (A) (g): | 117 | 100.4 | 108.3 | 108.29 | 195.8 | 204 |
| Cyclic Hydrogensiloxane (B) (g): | 5.18 | 3.85 | 3.86 | 3.83 | 6.83 | 6.95 |
| Ratio (A):(B) (wt./wt.): | 22.6 | 26.1 | 28.1 | 28.3 | 28.7 | 29.4 |
| Boron Lewis Acid (C) (ppm): | 15 | 10 | 15 | 5 | 8 | 8 |
| Solvent (E1) (g): | 175 | 161 | 273.1 | 273.33 | 492.4 | 510 |
| Diluent (D1) (g): | 273.3 | 233 | 251.3 | 251.1 | 472.9 | 491.7 |
| Diluent (D2) (g): | 0 | 0 | 0 | 0 | 0 | 0 |
| Additive Composition (I): | I-1 | I-2 | I-3 | I-4 | I-5 | I-6 |
| H % (as SiH): | 1 | 1.04 | 1.04 | 1.05 | 1.04 | 1.06 |
| Viscosity (cPs): | 496.5 | 1170 | 3570 | 1795 | 5028 | 2820 |

TABLE 3

Components and Properties of Examples 7-12

| Component/Property | Ex. 7 | Ex. 8 | Ex. 9 | Ex. 10 | Ex. 11 | Ex. 12 |
|---|---|---|---|---|---|---|
| Polydiorganosiloxane (A) (g): | 114.2 | 129.06 | 200.2 | 185.2 | 193.38 | 147.62 |
| Cyclic Hydrogensiloxane (B) (g): | 3.56 | 4.56 | 6.51 | 6.03 | 6.21 | 4.82 |
| Ratio (A):(B) (wt./wt.): | 32.1 | 28.3 | 30.75 | 30.71 | 31.14 | 30.63 |
| Boron Lewis Acid (C) (ppm): | 8 | 8 | 8 | 8 | 8 | 8 |
| Solvent (E1) (g): | 272.5 | 313.05 | 640.5 | 579 | 615 | 455.67 |
| Diluent (D1) (g): | 262.2 | 0 | 0 | 0 | 0 | 354.35 |
| Diluent (D2) (g): | 0 | 0 | 482.3 | 446.5 | 465 | 0 |
| Additive Composition (I): | I-7 | I-8 | I-9 | I-10 | I-11 | I-12 |
| H % (as SiH): | 1.06 | 0.0118 | 0.67 | 0.67 | 0.67 | 1.05 |
| Viscosity (cPs): | 5700 | 610.2 | 11020 | 9160 | 9080 | 5111 |

TABLE 4

Components and Properties of Examples 13-17

| Component/Property | Ex. 13 | Ex. 14 | Ex. 15 | Ex. 16 | Ex. 17 |
|---|---|---|---|---|---|
| Polydiorganosiloxane (A) (g): | 162.16 | 157.93 | 159.4 | 159.33 | 159.45 |
| Cyclic Hydrogensiloxane (B) (g): | 5.29 | 5.04 | 5.06 | 5.04 | 5.05 |
| Ratio (A):(B) (wt./wt.): | 30.65 | 31.34 | 31.5 | 31.61 | 31.57 |
| Boron Lewis Acid (C) (ppm): | 8 | 8 | 8 | 8 | 8 |
| Solvent (E1) (g): | 503.06 | 483.3 | 483.33 | 493.27 | 483.28 |
| Diluent (D1) (g): | 390.68 | 080.19 | 383.84 | 383.58 | 383.62 |
| Diluent (D2) (g): | 0 | 0 | 0 | 0 | 0 |
| Additive Composition (I): | I-13 | I-14 | I-15 | I-16 | I-17 |
| H % (as SiH): | 1.05 | 1.05 | 1.05 | 1.05 | 1.04 |
| Viscosity (cPs): | 4748 | 6840 | 9290 | 9220 | 9060 |

Examples 18-26 and Comparative Examples 1-5: Base Compositions

Various base compositions for forming release coatings are prepared using the additive compositions prepared above and certain comparative compositions. In particular, an Additive Composition (I) or Additive (I-C) is diluted to a desired wt. % with Organopolysiloxane (II-1) to give Base Compositions (BC) 1-9 and Comparative Compositions (CC) 1-5, respectively, which are evaluated via mist level evaluation (MLE) according to the procedure above. The particular components and parameters of Examples 18-26 and Comparative Examples 1-5, and the results of the MLE for Base Compositions (BC) 1-9 and Comparative Compositions (CC) 1-5 are set forth in Tables 5-7 further below.

Examples 27-28: Base Compositions

Base compositions for forming release coatings are prepared using the additive composition of Example 8 above. In particular, Additive Composition (I-8) is combined at a desired wt. % with Organopolysiloxane (II-1) with mixing, and the resulting mixture stripped of volatiles under vacuum (rotary evaporator; 120° C.; 2 hours) to prepare Base Compositions (BC) 10 and 11, which were analyzed alongside Examples 18-26 and Comparative Examples 1-5, and set forth therewith in Tables 5-7 below.

TABLE 5

Components and Properties of Examples 18-20 & Comparative Examples 1-2

| Component/Property | Comp. Ex. 1 | Comp. Ex. 2 | Ex. 18 | Ex. 19 | Ex. 20 |
|---|---|---|---|---|---|
| Organopolysiloxane (II-1) (g): | 600 | 588 | 520.02 | 520.02 | 559.98 |
| Additive Composition (I-2) (g): | 0 | 0 | 0 | 0 | 40.02 |
| Additive Composition (I-4) (g): | 0 | 0 | 0 | 0 | 0 |
| Additive Composition (I-6) (g): | 0 | 0 | 0 | 0 | 0 |
| Additive Composition (I-5) (g): | 0 | 0 | 79.98 | 0 | 0 |
| Additive Composition (I-7) (g): | 0 | 0 | 0 | 79.98 | 0 |
| Additive Composition (I-8) (g): | 0 | 0 | 0 | 0 | 0 |
| Additive (I-C1) (g): | 0 | 19 | 0 | 0 | 0 |
| Additive (I-C2) (g): | 0 | 0 | 0 | 0 | 0 |
| Additive (I-C3) (g): | 0 | 0 | 0 | 0 | 0 |
| Base Composition (BC): | CC-1 | CC-2 | BC-1 | BC-2 | BC-3 |
| Percent Additive (wt. %): | 0 | 2 | 4 | 4 | 2 |
| Mist Value (MLE) (mg/m$^3$): | 175.4 | 8.25 | 4.75 | 3.83 | 13.05 |

TABLE 6

Components and Properties of Examples 21-26

| Component/Property | Ex. 21 | Ex. 22 | Ex. 23 | Ex. 24 | Ex. 25 | Ex. 26 |
|---|---|---|---|---|---|---|
| Organopolysiloxane (II-1) (g): | 559.98 | 559.98 | 559.98 | 580.02 | 580.02 | 580.02 |
| Additive Composition (I-2) (g): | 0 | 0 | 0 | 19.98 | 0 | 0 |
| Additive Composition (I-4) (g): | 40.02 | 0 | 0 | 0 | 0 | 0 |
| Additive Composition (I-6) (g): | 0 | 40.02 | 0 | 0 | 19.98 | 0 |
| Additive Composition (I-5) (g): | 0 | 0 | 0 | 0 | 0 | 0 |
| Additive Composition (I-7) (g): | 0 | 0 | 40.02 | 0 | 0 | 19.98 |
| Additive Composition (I-8) (g): | 0 | 0 | 0 | 0 | 0 | 0 |
| Additive (I-C1) (g): | 0 | 0 | 0 | 0 | 0 | 0 |
| Additive (I-C2) (g): | 0 | 0 | 0 | 0 | 0 | 0 |
| Additive (I-C3) (g): | 0 | 0 | 0 | 0 | 0 | 0 |
| Base Composition (BC): | BC-4 | BC-5 | BC-6 | BC-7 | BC-8 | BC-9 |
| Percent Additive (wt. %): | 2 | 9 | 2 | 1 | 1 | 1 |
| Mist Value (MLE) (mg/m$^3$): | 6.58 | 3.21 | 1.95 | 23.44 | 7.51 | 4.96 |

TABLE 7

Examples 27-28 & Comparative Examples 3-5

| Component/Property | Comp. Ex. 3 | Comp. Ex. 4 | Comp. Ex. 5 | Ex. 27 | Ex. 28 |
|---|---|---|---|---|---|
| Organopolysiloxane (II-1) (g): | 594 | 588 | 588 | 700 | 700 |
| Additive Composition (I-2) (g): | 0 | 0 | 0 | 0 | 0 |
| Additive Composition (I-4) (g): | 0 | 0 | 0 | 0 | 0 |
| Additive Composition (I-6) (g): | 0 | 0 | 0 | 0 | 0 |
| Additive Composition (I-5) (g): | 0 | 0 | 0 | 0 | 0 |
| Additive Composition (I-7) (g): | 0 | 0 | 0 | 0 | 0 |
| Additive Composition (I-8) (g): | 0 | 0 | 0 | 42.3 | 20.9 |
| Additive (I-C1) (g): | 6 | 0 | 0 | 0 | 0 |
| Additive (I-C2) (g): | 0 | 12 | 0 | 0 | 0 |
| Additive (I-C3) (g): | 0 | 0 | 12 | 0 | 0 |
| Base Composition (BC): | CC-3 | CC-4 | CC-5 | BC-10 | BC-11 |
| Percent Additive (wt. %): | 1 | 2 | 2 | 2 | 1 |
| Mist Value (MLE) (mg/m$^3$): | 15.95 | 113.37 | 125.5 | 3.54 | 5.26 |

As shown, in comparison to utilizing no additive (e.g. CC-1) or a conventional anti-mist additive (e.g. CC-2), the inventive compositions dramatically reduce mist level at varying concentrations. Moreover, in comparison to conventional anti-mist additives and compositions (e.g. CC-3, CC-4, and CC-5), the inventive compositions provide improved anti-misting performance. This improved performance is shown with both low-viscosity additive compositions (e.g. Examples 18-26), as well as high-viscosity compositions prepared without diluent (e.g. Example 27-28).

Examples 29-31: Curable Compositions

Various curable compositions are prepared using the additive composition prepared in Example 3 above. In particular, Additive Composition (I-3) is formulated into curable compositions according to the procedures above, utilizing the components and parameters set forth in Table 8 below.

TABLE 8

Components and Parameters of Examples 29-31

| Component/Parameter | Ex. 29 | Ex. 30 | Ex. 31 |
|---|---|---|---|
| Additive Composition (I-3) (g): | 42.46 | 19.68 | 29.51 |
| Organopolysiloxane (II-2) (g): | 535.3 | 543.1 | 543.1 |
| Catalyst (III) (g): | 7.504 | 5.54 | 5.54 |
| Crosslinker (VIX-1) (g): | 0 | 19.68 | 9.838 |
| Crosslinker (VIX-2) (g): | 0 | 9.83 | 9.83 |
| Inhibitor (IV) (g): | 2.21 | 2.21 | 2.21 |
| SiH:Vi mol ratio: | 2.37 | 2.37 | 2.37 |
| Pt level (ppm): | 65 | 48 | 48 |
| Inhibitor/Pt (mol/mol): | 55 | 75 | 75 |

The curable compositions of Examples 29-31 are utilized to prepare coated substrates for performance evaluation. In particular, each curable composition is coated onto a substrate (glassine paper) and cured (oven temperature: 145° C.; dwell time: 1.2 s) to form a coated substrate, samples of which are evaluated for immediate extractable %, ROR %, and bath life according to the procedures above. The results of these evaluations are set forth in Table 9 below.

TABLE 9

Evaluation of Curable Compositions and Coatings of Examples 29-31

| Property | Ex. 29 | Ex. 30 | Ex. 31 |
|---|---|---|---|
| Coating bath viscosity at 26° C. (cPs): | 223.9 | 180 | 197.3 |
| Bulk Bath Life at 40° C. (hours): | 4 | 8 | 7 |
| Thin Film Bath Life (hours): | >9 | >9 | >9 |
| Immediate Extractable % (%): | 4.72 | 2.82 | 3.72 |

TABLE 9-continued

Evaluation of Curable Compositions and Coatings of Examples 29-31

| Property | Ex. 29 | Ex. 30 | Ex. 31 |
|---|---|---|---|
| Immediate ROR % (%): | 92.81 | 90.36 | 95.06 |
| 7 days Jungle Rot ROR % (%): | 96.68 | 96.99 | 98.77 |
| 1 month Jungle Rot ROR % (%): | 60.97 | 98.3 | 97.46 |
| 1 month RT aged ROR (%): | 98.67 | 98.71 | 98.75 |
| 3 month RT aged ROR (%): | 97.59 | 97.67 | 95.27 |

The curable compositions of Examples 29-31 are further evaluated for release force according to the procedures above. The results of the release force evaluations are shown in Table 10 below.

TABLE 10

Release Force Evaluations of Examples 29-31

| Property | Ex. 29 | Ex. 30 | Ex. 31 |
|---|---|---|---|
| 1 mo release force 0.3 MPM (g/inch): | 95.47 | 97.69 | 94.09 |
| 1 mo release force 10 MPM (g/inch): | 95.47 | 97.69 | 94.09 |
| 1 mo release force 100 MPM (g/inch): | 146.5 | 154.1 | 161.8 |
| 1 mo release force 300 MPM (g1inch): | 119.1 | 132 | 118.1 |
| 3 mo release force 0.3 MPM (g/inch): | 50.3 | 52.43 | 54.03 |
| 3 mo release force 10 MPM (g/inch): | 69.81 | 66.27 | 68.68 |
| 3 mo release force 100 MPM (g/inch): | 105.1 | 138.1 | 134.3 |
| 3 mo release force 300 MPM (g/inch): | 116.2 | 119.1 | 114 |

As shown, the inventive compositions provide fast cure rates with maintained anchorage, as demonstrated by the low immediate extractables and high rub-off resistance exhibited. Moreover, the inventive compositions provide good anchorage, as evidenced by the Jungle Rot anchorage tests, which indicate good anchorage under harsh aging conditions.

Examples 32-34: Curable Compositions

Various curable compositions are prepared and evaluated via mist level industrial evaluation (MLIE) according to the procedure above. In particular, various Additive Compositions (I) are blended together to give Additive Mixtures (AM) 1-3 according to the parameters set forth in Table 11 below.

TABLE 11

Additive Mixtures of Examples 32-34

| Component/Property | Ex. 32 | Ex. 33 | Ex. 34 |
|---|---|---|---|
| Composition I-9 (g): | 645 | 0 | 0 |
| Composition I-10 (g): | 602 | 0 | 0 |
| Composition I-11 (g): | 626 | 0 | 0 |
| Composition I-12 (g): | 0 | 448.7 | 0 |
| Composition I-13 (g): | 0 | 510.8 | 0 |
| Composition I-14 (g): | 0 | 491.7 | 0 |
| Composition I-15 (g): | 0 | 0 | 467.9 |
| Composition I-16 (g): | 0 | 0 | 485.9 |
| Composition I-17 (g): | 0 | 0 | 492.1 |
| Additive Mixture (AM): | AM-1 | AM-2 | AM-3 |

The Additive Mixtures (AM) 1-3 are combined (blended) together with additional components to give Base Compositions (BC) 12-14, respectively. The particular components and parameters of Base Compositions (BC) 12-14 are set forth in Table 12 below.

TABLE 12

Base Compositions of Examples 32-34

| Component/Property | Ex. 32 | Ex. 33 | Ex. 34 |
|---|---|---|---|
| AM-1 (g): | 1788.3 | 0 | 0 |
| AM-2 (g): | 0 | 1451.2 | 0 |
| AM-3 (g): | 0 | 0 | 1616.8 |
| Crosslinker (VIX-1) (g): | 1788.3 | 1451.2 | 1616.8 |
| Crosslinker (VIX-2) (g): | 894.15 | 725.6 | 808.4 |
| Base Composition (BC): | BC-12 | BC-13 | BC-14 |

Base Compositions (BC) 12-14 are used to prepare curable compositions, which are evaluated alongside a comparative anti-mist additive free composition (Comparative Example 6), according to the procedures above. In particular, the curable compositions are formulated using the particular components and parameters set forth in Table 13 further below to achieve a final additive concentration of 1 wt. %. Each curable composition is then evaluated for cure performance via extractable % determination and misting via MLIE using the procedures set forth above. For the mist evaluation, each curable composition is disposed in the coating bath of the industrial high-speed coater, which is then operated to a coater running speed of ~1000 m/min while the mist levels are recorded and averaged as previously described. The particular components and parameters of the curable compositions of Examples 32-34 and Comparative Example 6, and the results of the MLIE and cure performance evaluations thereof, are set forth in Table 13 below.

TABLE 13

Curable Compositions of Examples 32-34 and Comparative Example 6

| Component/Property | Comp. Ex. 6 | Ex. 32 | Ex. 33 | Ex. 34 |
|---|---|---|---|---|
| BC-12 (g): | 0 | 679.25 | 0 | 0 |
| BC-13 (g): | 0 | 0 | 679.25 | 0 |
| BC-14 (g): | 0 | 0 | 0 | 679.25 |
| Additive (I-C1) (g): | 84.83 | 0 | 0 | 0 |
| Organopolysiloxane (II-1) (g): | 7980 | 7194.97 | 7199.96 | 7199.96 |
| Hydrosilylation Cataiyst (III) (g): | 114.25 | 107.75 | 107.75 | 107.75 |
| Inhibitor (IV-2) (g): | 20 | 18 | 18.05 | 18.05 |
| Crosslinker (VIX-3) (g): | 284.36 | 0 | 0 | 0 |
| Percent Additive (wt. %): | 1 | 1 | 1 | 1 |
| Mist Value (MLIE) (mg/m$^3$): | 15.2 | 4.15 | 2.55 | 1.77 |
| Immediate Extractable% (%): | 5.4 | 1.98 | 2.66 | 2.52 |

As shown, the inventive compositions provide markedly improved performance characteristics under industrial coating conditions. Specifically, the inventive compositions demonstrate anti-mist/mist reduction properties, as shown by the significant decrease in mist values during the evaluation period of the MLIE for the curable compositions of Examples 32-34 over Comparative Example 6. Additionally, the inventive compositions also provide superior cure performance, as evidenced by the reduced extractable % exhibited by the curable compositions of Examples 32-34 over Comparative Example 6.

Definitions and Usage of Terms

Abbreviations used in the specification, if not otherwise set forth, have the definitions set forth in Table 14 below.

TABLE 14

Abbreviations

| Abbreviation | Definition |
| --- | --- |
| cP or cps | centiPoise |
| d | day |
| Da | Daltons |
| DP | degree of polymerization |
| FTIR | Fourier Transfer Infra-Red |
| g | grams |
| GC | gas chromatography |
| GPC | gel permeation chromatography |
| HPLC | high performance liquid chromatography |
| Me | methyl |
| mg | milligrams |
| MHz | megaHertz |
| mL | milliliters |
| mm | millimeters |
| Mn | number average molecular weight as measured by GPC |
| Mp | Peak molecular weight as measured by GPC |
| mPa · s | milli-Pascal seconds |
| MS | mass spectroscopy |
| Mw | weight average molecular weight |
| Mz | Z-average molecular weight |
| NMR | nuclear magnetic resonance |
| O.D. | outer diameter |
| PD | polydispersity |
| Ph | phenyl |
| ppm | parts per million |
| PTFE | polytetrafluoroethylene |
| RH | relative humidity |
| RT | room temperature of 25° C. |
| s | seconds |
| SiH content | hydrogen, as silicon bonded hydrogen, as measured by 29 Si NMR |
| THF | tetrahydrofuran |
| μL | microliter |
| μm | micrometer |
| Vi | vinyl |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

What is claimed is:

1. A method of preparing an additive composition for a release coating composition, said method comprising:
preparing a branched cyclic polyorganohydrogensiloxane compound by reacting together:
(A) a hydroxyl terminated polydiorganosiloxane of formula

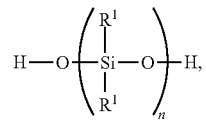

where subscript n is 2 to 2,000 and each $R^1$ is independently selected from the group consisting of monovalent hydrocarbon groups and monovalent halogenated hydrocarbon groups; and
(B) a cyclic polyorganohydrogensiloxane of formula $(RHSiO_{2/2})_v$, where subscript v is 3 to 12 and each R is an independently selected monovalent hydrocarbon group; in the presence of
(C) a boron containing Lewis acid; and
combining the branched cyclic polyorganohydrogensiloxane compound with (D) a polyorganohydrogensiloxane diluent having the formula:

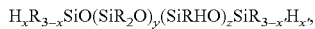

where R is defined above, subscripts x and x' are each independently 0 or 1, subscript y is from 0 to 250, and subscript z is from 0 to 250, with the provisos that y+z≥1 and z+x+x'≥2,
thereby preparing the additive composition.

2. The method claim 1, wherein the (C) boron containing Lewis acid is a trivalent boron compound with at least one perfluoroaryl group.

3. The method claim 1, wherein subscript n is 2 to 1,000, subscript v is 4 to 10, each R is an alkyl group of 1 to 6 carbon atoms, and each $R^1$ is selected from the group consisting of an alkyl group of 1 to 20 carbon atoms, an alkenyl group of 2 to 20 carbon atoms, an aryl group of 6 to 20 carbon atoms, or a halogenated alkyl group of 1 to 20 carbon atoms.

4. The method of claim 1, wherein preparing the branched cyclic polyorganohydrogensiloxane compound comprises combining the (A) hydroxyl terminated polydiorganosiloxane and the (B) cyclic polyorganohydrogensiloxane in the presence of the (C) boron containing Lewis acid and (E) a hydrocarbon solvent for a period of time to prepare a reaction mixture comprising the branched cyclic polyorganohydrogensiloxane compound in the (E) hydrocarbon solvent.

5. The method of claim 4, wherein the method comprises combining the (D) polyorganohydrogensiloxane diluent and the reaction mixture to prepare a blend, and removing the (E) hydrocarbon solvent from the blend to prepare the additive composition.

6. The method of claim 1, wherein the branched cyclic polyorganohydrogensiloxane compound is prepared in the presence of the (D) polyorganohydrogensiloxane diluent to give the additive composition.

7. The method of claim 1, wherein the branched cyclic polyorganohydrogensiloxane compound has the following average unit formula:

$$[(HRSiO_{2/2})_a(\text{---}RSiO_{3/2})_b]_c[(R^1{}_2SiO_{2/2})_n]_d,$$

where subscript a is from 0 to 10; subscript b is from 1 to 4, with the proviso that a+b=v, where v is defined above; 0<c<100; and 0<d<100, with the proviso that c>d.

8. The method of claim 1, wherein each molecule of the branched cyclic polyorganohydrogensiloxane compound on average comprises at least three moieties indicated by subscript c.

9. An additive composition prepared according to the method of claim 1.

10. A release coating composition, comprising:
(I) the additive composition of claim 9;
(II) an organopolysiloxane including at least two silicon-bonded ethylenically unsaturated groups; and
(III) a hydrosilylation catalyst.

11. The release coating composition of claim 10, further comprising (IV) a hydrosilylation-reaction inhibitor.

12. The release coating composition of claim 10, comprising the branched cyclic polyorganohydrogensiloxane compound of the (I) additive composition in an amount of from greater than 0 to 5 weight percent based on the total weight of the release coating composition.

13. The release coating composition of claim 10, wherein the (II) organopolysiloxane comprises a branched organopolysiloxane having the silicon-bonded ethylenically unsaturated groups in M siloxy units.

14. The release coating composition of claim 10, comprising the (II) organopolysiloxane in an amount of from 80 to 99 weight percent based on the total weight of the composition.

15. The release coating composition of claim 10, wherein:
(i) the release coating composition is solventless; or (ii) the release coating composition is solvent based.

16. A method of forming a coated substrate, said method comprising:
applying a composition on a substrate; and
curing the composition to give a release coating on the substrate, thereby forming the coated substrate;
wherein the composition is the release coating composition of claim 10.

17. The method of claim 16, wherein the substrate comprises cellulose and/or a polymer.

18. A coated substrate comprising a release coating disposed on a substrate formed in accordance with the method of claim 16.

* * * * *